(12) United States Patent
Baird et al.

(10) Patent No.: US 6,258,928 B1
(45) Date of Patent: Jul. 10, 2001

(54) PROCESS FOR IMPROVING CHARACTERISTICS OF A POLYAMIDE

(75) Inventors: Bennett Ray Baird, Unionville, PA (US); David Malcolm Lewis, West Yorkshire (GB); Kamleshkumar Chunilal Patel, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/544,611

(22) Filed: Apr. 6, 2000

(51) Int. Cl.⁷ .......................... C08G 69/02; C08G 69/04; D06P 3/00; C09B 67/00; C09B 67/28
(52) U.S. Cl. .......................... 528/310; 528/312; 528/313; 528/322; 528/332; 528/336; 528/337; 528/480; 8/530; 8/531; 8/582; 8/629; 8/650
(58) Field of Search .................................. 8/582, 530, 531, 8/629, 650; 528/480, 310, 312, 313, 322, 332, 336, 337

(56) References Cited

U.S. PATENT DOCUMENTS

| | | |
|---|---|---|
| 1,398,357 | 11/1921 | Briggs et al. . |
| 2,869,968 | 1/1959 | Thummel et al. . |
| 3,577,392 | 5/1971 | Kochhar et al. . |
| 3,652,199 | 3/1972 | Leung . |
| 3,839,392 | 10/1974 | Follows et al. . |
| 3,907,746 | 9/1975 | Follows . |

FOREIGN PATENT DOCUMENTS

| | | |
|---|---|---|
| 549986 | 12/1942 | (GB) . |
| 731005 | 6/1955 | (GB) . |
| 892379 | 3/1962 | (GB) . |
| 1793016 A1 | 2/1993 | (SU) . |

OTHER PUBLICATIONS

Richard W. Harold, Richard S. Hunter, Special Scales for White Colors, 1987, p. 140–146, Color Technology in the Textile Industry. (No Month).

Maillincrodt Baker, Inc., Ammonium Thiocyanate, MSDS No. A6276, Eff. Date Dec. 8, 1996, http://www.itbaker.com/msds/a6276.htm, Oct. 13, 1999 pp. 1–7.

Maillincrodt Baker, Inc., Ammonium Thiocyanate, Solution, MSDS No. A6280, Eff. Date Dec. 8, 1996, http://www.it-baker.com/msds/a6280.htm, Oct. 13,1999 pp. 1–7.

*Primary Examiner*—P. Hampton-Hightower

(57) ABSTRACT

A process for improving characteristics such as, whiteness retention, degradation, and dyeability of a polyamide by contacting the polyamide with thiocyanate. A polyamide produced by the process has improved dyed color depth, dyed color uniformity, hue, elimination of light dyeing ends, protection of dye sites from degradation, protection from UV degradation, reduced yellowing or oxidation, and/or resistance to loss of dyeability.

20 Claims, 10 Drawing Sheets

PROCESS FOR IMPROVING CHARACTERISTICS OF A POLYAMIDE

BACKGROUND OF THE INVENTION

1. Field of the Invention

The present invention relates to a process for treating polyamides, such as nylon, to improve a property of the polyamide. The invention also relates to polyamides having improved characteristics, such as improved dyed color depth, dyed color uniformity, hue, elimination of light dyeing ends, protection of dye sites from degradation, protection against ultra-violet (UV) degradation, reduced yellowing or oxidation, and/or resistance to loss of dyeability.

2. Description of Related Art

Polyamides often contain terminal primary amines, which are affected by reactive and/or oxidizing environments found in prolonged storage or in certain preparatory processing applied to polyamides, such as heat setting or molding.

Heat setting is often applied to substrates containing polyamide. Heat setting involves heat exposure for limited times at limited temperatures. Heat setting is useful, for example, to process polyamide fabrics or garments containing spandex fiber. Heat setting is performed to confer dimensional stability and wrinkle resistance to the fabrics or garment.

Often the heat set process results in some oxidation and yellowing of the nylon with loss of dyeability, dyed color uniformity, color depth, and/or hue. Yellowing of the polyamide component is noticeable in the natural or un-dyed state. Yellowing is objectionable in fabrics meant to be white and detracts from the desired color contrast sought in dyed fabric prints on a white fabric background.

Current methods to impart whiteness retention in nylon fabrics include adding stabilizers of the IRGANOX® type from CIBA GEIGY (Basel, Switzerland) or Nylostab Seed® from CLARIANT (Basel, Switzerland). Known whiteness retention and heat stabilizers for nylon include the phosphorus oxy acid type and their salts, as well as, the classes of materials disclosed in U.S. Pat. Nos. 3,839,392 and 3,907,746.

Stabilizers added to nylon polymer often excessively foam the polymer when added to an autoclave polymerization process. Moreover, high stabilizer loadings often produce poor polymer and poor uniformity from batch to batch. Also, loss of the stabilizer additive from nylon yarn and fabrics during aqueous processing steps, especially dyeing, often make the addition of stabilizers undesirable.

There is thus a need to provide polyamides and products, such as fabrics constructed therefrom that retain their dyeability characteristics and whiteness retention, and avoid or reduce disadvantages of current methods.

SUMMARY OF THE INVENTION

In accordance with these needs, there has been provided a process for improving characteristics of a polyamide having X gram equivalents of amine end groups per 1,000 kg of polyamide, comprising contacting prior to dyeing or any treatment that makes at least some of the amine end groups unavailable for dyeing, the polyamide or a salt useful to form the polyamide, with a thiocyanate groups, such that the polyamide after contacting or the polyamide formed from the salt contains Y gram equivalents of thiocyanate groups that protect the amine end groups, such that about $0.001 < Y/X < $ about $1.5$.

The present invention also provides a polyamide having improved characteristics, wherein the polyamide contains terminal amine dye sites protected by up to about a stoichiometric amount of thiocyanate groups.

The present invention further provides a composition comprising a polyamide salt solution and a thiocyanate.

Further in accordance with the objectives of the present invention, there is provided a process for improving characteristics of a polyamide, comprising contacting a polyamide having amine end groups with thiocyanate, such that the polyamide after contacting contains up to about a stoichiometric amount of thiocyanate groups based on the amine end groups.

The present invention also provides a process for improving dyeability characteristics of a polyamide, comprising contacting a polyamide prior to dyeing or heat-setting with an amount of thiocyanate effective to protect dye-sites of the polyamide.

The present invention further provides a process for improving dyeability characteristics of a polyamide, comprising contacting a polyamide salt with a thiocyanate, and polymerizing the salt to form a polyamide.

The present invention also provides a process for improving characteristics of a polyamide fiber, yarn, film, tow, fabric, molded article, or garment comprising contacting the fiber, yarn, film, tow, fabric, molded article, carpet, garment, or other article prior to any dyeing or other treatment that makes the amine end groups unavailable for dyeing, with a thiocyanate.

Further objects, features, and advantages of the invention will become apparent from the description that follows.

BRIEF DESCRIPTION OF THE DRAWINGS

The invention can be more fully understood from the following detailed description thereof in connection with accompanying drawings described as follows.

DESCRIPTION OF PREFERRED EMBODIMENTS

Figure 1:
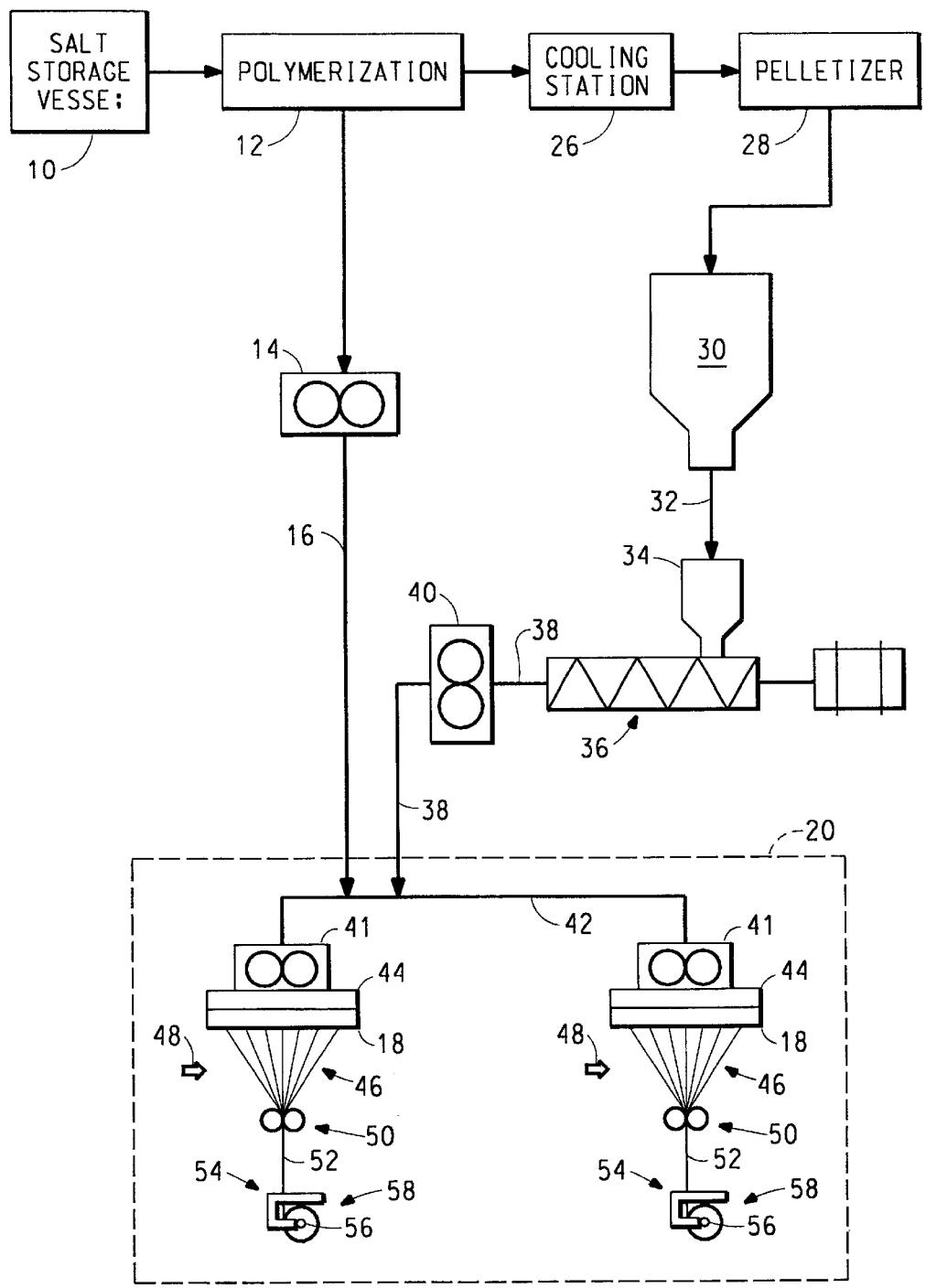
FIG. 1 is a schematic illustration of a system that can be used for producing a polyamide filament useful in the present invention.

The invention is directed to a process for improving characteristics, such as dyeability, of a polyamide, such as nylon, by treating the polyamide polymer or salt. The term salt is understood in the art as the product of an amine and acid used to form the polyamide. An exemplary salt is hexamethylene diammoniumadipate prepared from a mixture of hexamethylene diamine and adipic acid, which is used to form Nylon 66.

A polyamide treated by the invention shows superior characteristics in comparison to an untreated polyamide when subjected to processes involving prolonged storage, oxidizing environmental exposure, UV exposure, heat exposure, molding, and/or dyeing. Also, fabric processed using the treated polyamide shows improved dyeability when dyed with, for example, traditional acid dyes or fiber reactive dyes.

In the process of the invention, a polyamide, such as nylon, is contacted with a reagent capable of providing free thiocyanate (SCN–) anion. A useful thiocyanate ion contacting mechanism is via an aqueous medium, however any suitable means for contacting the thiocyanate with the polyamide may be used. Other means for contacting a polyamide or a salt useful to form the polyamide with the thiocyanate include vapor phase transport of thiocyanate or reagents that form thiocyanate to the polyamide, melt blending of polyamide and thiocyanate, and the use of alternative solvent systems other than water, such as non-aqueous solvents, alone or mixed with water. Any solvent can be used that is a solvent for thiocyanate and absorbs or swells nylon. Examples include, supercritical $CO_2$ and alcohols.

In an embodiment of the process, the treatment step begins when the polyamide is contacted with an aqueous solution of thiocyanate anion. Treatment ends upon removal of the polyamide from the solution. Any duration of treatment can be used to give improved characteristics. For example, the duration of treatment can extend from about 0.1 second to about 120 minutes, preferably for a duration of about 30 minutes to about 65 minutes.

The treatment can be performed at any desired temperature, pressure, and pH to provide improved dyeability. The treatment step can be performed at a temperature of about 20° C. to about 120° C., and preferably 70° to 110° C. Adequate pressure equipment should be provided for aqueous solutions at temperatures above 100° C. Preferably, the aqueous solution has a pH of about 3.5 to about 6.0.

The polyamide or the salt useful to form the polyamide contains X gram equivalents of amine end groups per 1,000 kg of polyamide, such that the polyamide or the polyamide formed from the salt after contacting with thiocyanate contains Y gram equivalents of thiocyanate that protect the amine end groups, such that the range is preferable of about $0.001 < Y/X < $ about 1.5, more preferably, about $0.01 < Y/X < $ about 1.3, and most preferably, $0.1 < Y/X < 1.1$. These range have been found to provide the optimum protection of the amine end groups, while at the same time minimizing the amount of SCN used. Any concentration in the contacting medium of thiocyanate may be used to improve characteristics by, for example, protecting the amine end groups of the polyamide. For example, an aqueous contacting medium can have a thiocyanate concentration of about 0.5 to about 25 grams of thiocyanate per liter.

The amount of thiocyanate provided to the polyamide regardless of the contacting means employed, may be in the range of about 0.0001 to about 10%, for example 0.001% to about 0.5%, such as about 0.01% to about 0.1%, by weight of the polyamide. However, these percentages depend on the amine end-group content of the polyamide, and the type of treatment used. What is important is that the final polyamide has at least some of the amine-dye sites protected, e.g., Y is at least $0.001X$.

It is preferred that the contacting with thiocyanate occurs prior to dyeing or treatments, such as the triazine treatment of UK Patent No. 892,379 that consume or otherwise make all or at least a portion of the amine-end groups unavailable for dyeing. This is because a purpose of the SCN treatment is to protect the amine end groups, so that they can later be dyed. Thus, the contacting should occur prior to dyeing or other treatment that react with, consume, or otherwise make the amine groups unavailable for dyeing, to realize the advantages of the invention.

Any desired polyamide may be treated according to the invention. Advantageously, the treated polyamide can be in any form, for example, as bulk polymer flake or granules, films, fibers, staple fibers, molded articles, continuous filament tows, continuous filament yarns, fabrics (including industrial fabrics used for example, in sails and parachutes) carpets, garments, or other articles that contain at least a portion of polyamide. The treatment can occur at any stage of the process as depicted in FIG. 1. For example, the thiocyanate can be applied with or as a lubricant finish to the fibers, to alleviate adverse effects of reduced whiteness caused by many conventional finishes or to alleviate adverse effects of the environment upon storage of the polymer, fiber, or fabric. The treatment to, for example, fabric and garments can occur after the completion of all processes depicted in FIG. 1, for example, during fabric formation and/or garment production.

As mentioned above, the polyamide preferably has free terminal amine groups. The polyamide can have any desired amount of such groups. For example, for a fiber-forming polyamide, the amount can be about 20 to about 120 grams equivalent per 1,000 kilograms of polymer. For a polyamide used in adhesives or films, the amount can be up to about 1,000. The terminal amine end groups are dye-sites protected by the thiocyanate treatment. Other potential dye sites that may also be protected by the invention include terminal carboxyl groups and imido groups along the nylon polymer chain.

The polyamide can be used alone or mixed in any desired amount with other polymer synthetic fibers such as spandex, polyester and natural fibers like cotton, silk, wool or other typical companion fibers to nylon.

Polyamides suitable for use in this invention include synthetic melt spinnable polyamide materials having recurring amide groups (—CO—NH—) as an integral part of the polymer chain. The term polyamide refers to polyamide homopolymers, copolymers, and mixtures thereof.

Suitable polyamides that can be used in accordance with the invention include poly(hexamethylene adipamide) (i.e., nylon 6,6) homopolymer, poly(e-caproamide) (i.e., nylon 6) homopolymer, polydodecanolactam (i.e., nylon 12) homopolymer, poly(tetramethyleneadipamide) (i.e., nylon 4,6) homopolymer, poly(hexamethylene sebacamide) (i.e., nylon 6,10) homopolymer, the polyamide of n-dodecanedioic acid and hexamethylenediamine (i.e., nylon 6,12) homopolymer, the polyamide of dodecamethylenediamine and n-dodecanedioic acid (i.e., nylon 12,12) homopolymer, copolymers thereof, and mixtures thereof.

Illustrative polyamides include copolymers made from a dicarboxylic acid component, such as terephthalic acid, isophthalic acid, adipic acid or sebacic acid, and a diamine component, such as hexamethylenediamine, 2-methylpentamethylenediamine, or 1,4-bis(aminomethyl) cylcohexane.

The polyamides can be prepared using batch or continuous polymerization methods known in the art. As illustrated in FIG. 1, a suitable method of preparing polyamides is to store a polyamide salt mixture/solution in a salt storage vessel 10. The salt mixture/solution is fed from the storage vessel 10 to a polymerizer 12, such as a continuous polymerizer or a batch autoclave. In the polymerizer 12, the polyamide salt mixture/solution is heated under pressure in a substantially oxygen free inert atmosphere as is known in the art. The polyamide salt mixture/solution is polymerized into molten polymer. When the polymerizer 12 is a continuous polymerizer, the molten polymer can be fed from the continuous polymerizer 12 and conveyed, such as by a booster pump 14, through a transfer line 16 to at least a spinneret 18 of at least a spinning machine 20.

Alternatively when the polymerizer 12 is a continuous polymerizer, or when the polymerizer 12 is a batch autoclave, the molten polymer can be extruded from the polymerizer 12, for example, in the form of strands. The extruded polymer strands can be quenched at a cooling station 26, such as in a water bath, into solid polymer strands and fed to a pelletizer 28 which cuts, casts or granulates the polymer into flake. Other terms used to refer to this "flake" include pellets, granulates and particulates. The flake can be any shapes and sizes to be suitable for use in the current invention.

The flake can be fed to a holding vessel or conditioner 30 where the flake can be stored or conditioned, e.g., heated, water added or removed, and/or solid phase polymerized. Flake can be transported through a line 32 to a gravimetric or volumetric flake feeder 34, which is adapted to feed the flake into a melt extruder 36. The flake is melted in the melt extruder 36 and molten polymer is extruded from an outlet of the melt extruder 36 to a transfer line 38. The extruded molten polymer is conveyed, such as by a booster pump 40, through the transfer line 38 to at least a spinneret 18 of at least a spinning machine 20.

Typically, the residence time of the molten polymer in the melt extruder 36 and the transfer line 38 is about 3 to about 15 minutes, and preferably about 3 to about 10 minutes.

Products that can be made by the process include flake, spun articles (e.g., filaments), blow molded articles (e.g., bottles), extruded articles (e.g., films), and injection molded shaped articles.

Referring again to FIG. 1, preferably, the article is formed by spinning the polyamide into at least one filament 46. Metering pumps 41 can be used to force the molten polymer from a manifold 42 connected to the transfer line 16 or 38 through spin filter packs 44 and then the spinnerets 18, each having a plurality of capillaries through the spinneret 18 thereby spinning the molten polymer through the capillaries into a plurality of filaments 46.

The filaments 46 from each spinneret 18 are quenched typically by an air flow (illustrated in FIG. 1 by arrows 48) transverse to the length of the filaments 46. The filaments 46 can then be converged by a convergence device 50 into a yarn and wound by a wind-up device 54, for instance, on a tube 56 into a package 58. The resulting filaments 46 can be made into yarns 52 and fabrics for a variety of applications well known in the art.

Any desired source of thiocyanate can be used. For example, suitable thiocyanate sources include any of the alkali metal thiocyanate salts, ammonium thiocyanates, alkaline earth, other metallic, or ionic organic thiocyanate. Useful organic thiocyanates include methyl thiocyanate and butyl thiocyanate. Especially useful alkali metal thiocyanates include lithium, sodium, and potassium. Especially useful alkaline earth metals include beryllium, magnesium, calcium, and strontium. Other useful metallic thiocyanates include zinc, tin, and copper. Especially useful source of thiocyanate include sodium, potassium, and ammonium thiocyanate.

As understood by one in the art, appropriate precautions should be taken in handling thiocyanate, since it could decompose into undesirable dangerous by-products, such as hydrogen cyanide and hydrogen sulfide, upon, for example, excessive heating.

During the treatment step, the polyamide can become impregnated with thiocyanate. Preferably, after the treatment step, the polyamide, such as fabric, is rinsed, for example, with water, to remove excess thiocyanate not bound to the polyamide. The polyamide may be repeatedly rinsed to remove excess thiocyanate until the rinse water tests negative for thiocyanate using ferric ion. The excess thiocyanate is preferably removed because excess residual thiocyanate in an amount substantially greater than the stoichiometric amount, based on the concentration of terminal amine end in the polymer, as occurs by the process described in U.S. Pat. No. 3,577,392, may have an adverse effect on polymer whiteness and dye uptake.

The polyamide may also be reductively scoured, such as with POLYCLEAR NPH® (Henkel Corporation), according to methods known in the art for nylon fabric finishing and dyeing. Scouring is a cleaning process wherein a detergent or reductive scouring chemical such as sodium hydrosulfite is used to clean the fabric. Scouring is used to impart better whiteness and dyeability by removal of potential contaminants from the polyamide. The polyamide may be pre-scoured prior to thiocyanate treatment in order to clean the polyamide. The polyamide may also be scoured after the treatment step.

Any concentration, time, and temperature of scouring may be used to provide, for example, improved dyeability. For example, the fabric can be scoured for about 30 minutes in an aqueous solution containing about 5 g/L of POLY-CLEAR NPH® at a temperature of about 85° C. The scouring step may occur at any time during the process including before or after an optional heat setting step.

The polyamide or salt may optionally be heat set. Heat setting is conventionally practiced on nylon products, such as those containing spandex, which is a form of polyurethane elastomer, in order to prevent curling and to confer dimensional stability and wrinkle resistance to the product. Heat setting generally has adverse effects on the dye sites such as the amine end groups. For example, heat setting of polyamide fabrics plays a role in the loss of amine ends with a concomitant loss of dyeability or objectionable variation in dyeability. The thiocyanate treatment of this invention to polyamides provides a remedy for the loss of amine ends and the dyeability variation generally resulting from amine end loss in heat set fabrics. Generally, the heat set method is quick exposure (less than 5 minutes, such as less than 2 minutes), above the softening point of at least one of the polymers, but below the melting or decomposition point of any of the polymers, to allow it to relax. Typical heat set conditions, especially for spandex containing nylon, are from about 170° C. to about 210° C. for about 20 seconds to about 80 seconds, and preferably about 190° C. for about 45 seconds.

Often, but not necessarily, the polyamide or polyamide formed from the salt is dyed, generally after it is heat set. Even if not dyed, the present process is advantageous in reducing yellowing of the un-dyed polyamide. Any type of dye can be used to dye the polyamide. The dye application can be a conventional acid dye, dispersed (non-ionic) dye, or fiber reactive dye process. The known dyes for polyamide, which react with the amine ends of the polyamide polymer, may be ionically bound (acid dye) or covalently bound (reactive dye).

Examples of useful acid dyes include Acid Blue 45, NYLOSAN violet F-BL, INTRACID rhodamine B, SUPRANOL navy R, NYLON turquoise GLM, NYLAN-THRENE yellow FLW, and ERIONYL red B. Examples of useful fiber reactive dyes include STANALAN dyes such as yellow MFFR, br. blue MFFR, scarlet MFFN, navy MFFB, dk. red MFFN, and grey MFFN.

Any dyeing process known in the art can be used. The dyeing process generally includes placing the polyamide in a bath prepared to contain about 0.5–10% dye on weight of polyamide and an adjusted pH of about 3–8, depending on dye chemistry. Dyeing is generally continued for about 90 minutes total at 100° C.

Pad dyeing is a conventional dyeing process applied widely to textiles and to nylon fabrics. In the pad dyeing process a dye solution is applied via a pad (also known as a "padder" or "mangle"). The pad is continuously supplied with dye solution and usually there are two pads in a nip roll arrangement. The fabric or garment is fed through the nip. The action of the nip squeezes the dye solution from the pad into the fabric or garment, thus soaking the garment with dye solution, and removing excess solution. Polyamides treated with thiocyanate according to the invention, can have a dye applied by such a padding process.

Dyeing is performed on the polyamide with any of the acid dyes used in the art, including leveling dyes, milling dyes, metal complex dyes; and with fiber reactive dyes. One skilled in the art can readily determine under what conditions of pH and temperature these acid dyes or fiber reactive dyes should be applied to the polyamide, e.g., leveling dyes can be applied at neutral or weakly acid pH and milling dyes can be applied at pH from 5.2 to 6.2. Certain dye auxiliary chemicals including acetic acid and ammonium acetate along with leveling agents and sequestrants are known acid dyeing liquor constituents that can be used to dye the polyamide. One set of typical dyeing conditions is:

a liquor to nylon polyamide ratio of about 30:1, known also as liquor to goods ratio;

an initial temperature of about 40° C. at which the nylon polyamide is added;

about 10 to about 20 minutes at about 40° C. before the acid dyes are added;

about 45 minutes to raise the dye liquor and nylon polyamide to about 100° C.;

and about a 45 minute to 1 hour period during which the dye liquor and nylon polyamide is maintained at about 100° C.

Such standard conditions are disclosed in the publication *DYEING PRIMER a Series of Short Papers on the fundamentals of Dyeing* and reprinted from *Textile Chemist and Colorist by the American Association of Textile Chemists and Colorists*, Research Triangle Park, N.C., Copyright 1981, each incorporated herein by reference in their entirety.

The thiocyanate treated polyamide or polyamide from the salt of the present invention can have a retained dyeability of at least about 50% of the untreated polyamide after exposure to heat setting temperatures. The untreated polyamide may retain as little as 10% of its dyeability, compared to the treated polyamide, after treatment at the highest temperatures commercially employed to heat set fabrics.

This invention enables higher capital productivity, lower manufacturing cost, and greater process flexibility, (since as described earlier, any form of the polymer, from salt to final product can be treated) than prior methods for treating and dyeing fabrics. The process imparts improved dyeability characteristics and decreases oxidation, which results in yellowing of polyamides. The process of the invention does not require mixing the dye and the thiocyanate in a dye bath together. In fact, it is important to contact the polyamide with thiocyanate prior to any dyeing, and preferably before any heat setting, in order for the thiocyanate to protect the amine end groups of the polymer polyamide. The amine dye sites are protected from heat, oxidizing, UV degradation, environmental contaminants and anything else that reduces dyeability at dye-sites. Treating the polyamide with thiocyanate provides for improved storage stability, improved dyeability, improved uniformity of appearance and whiteness retention.

The treated polyamide has improved dyeability and whiteness retention; because, it is believed the thiocyanate protects the amine end groups and/or other dye sites from degradation due to, for example, heat treatment or UV exposure. The thiocyanate is believed to be incorporated into the polyamide by covalent and/or ionic bonding adjacent to the dye-sites. The thiocyanate treated polyamide preferably has a retained whiteness level of about 50% to about 95% of its whiteness level prior to the heat exposure.

This invention will now be illustrated by the following non-limiting examples.

EXAMPLES

The following test methods were used in the examples that follow. Samples were measured individually for Whiteness, W, and Yellowness, Y, using a *MACBETH Laboratories color eye reflectance spectrophotometer*. First, by determining their CIE color coordinates: L, a, b; and then calculating W and Y by means known in the art. Details of this measurement and calculation are found in *Color Technology in the Textile Industry*, $2^{nd}$ Edition, published by Committee RA 36, AATCC (1997); see in this volume: *Special Scales for White Colors* by Harold and Hunter, pp 140–146, and the references therein, all incorporated herein by reference in their entirety.

Amine end groups for the polymer are measured by titration. Specifically, nylon polymer, yarn or fabric is dissolved in (50 ml) methanol and phenol solution (8:2 phenol:methanol). The sample size taken is 1–2 grams, depending upon the amine end group number expected for this nylon sample. The solution is filtered to remove insoluble delusterant or titanium dioxide. This supernatant is mixed with sufficient water to make a 100 ml solution. This solution is titrated using aqueous perchloric acid, standardized versus primary standard alkal:. The acid end point determined using potentiometry or an acid indicator, as is known in the art, is recorded. The volume of perchloric acid consumed is related to the amine end group concentration via the weight of nylon sample taken. The amine end group concentration is expressed as gram equivalents of amine groups per $10^6$ grams of nylon.

Example 1

A warp knit (tricot) greige fabric from DuPont Type 665 nylon 66 yarns of 40 denier with 34 round cross section filaments (1.18 denier per filament) and containing 20% DuPont LYCRA® brand spandex 40 denier monofilaments was cut into two equal samples of ½ square yard each. A first sample of the greige fabric was treated with 5 grams per liter aqueous potassium thiocyanate solution (KSCN) adjusted to a pH of 4 with acetic acid, at boiling temperature (100° C.) for 60 minutes in a MATHIS JFO 4 port dyeing machine. The thiocyanate treatment bath was dropped and the fabric sample rinsed by over flow with water. The sample was allowed to air dry.

A control fabric, the second sample of greige fabric, measuring ½ square yard, was sewn together with the air-dried first sample, carefully matching the lengthwise run of yarns in the joined samples. The joined samples were fixed to the metal pins of the moving belt of a KRANTZ four bay heat setting oven and heat set at 196° C. for 45 seconds. Afterwards, both samples were measured individually for whiteness, W, and yellowness, Y, using a MACBETH Laboratories eye reflectance colorimeter.

The joined samples were dyed competitively using a standard method with equilibrium dyeing conditions. First, the joined samples were scoured in an aqueous bath containing ammonia and MERPOL HCS (nonionic surfactant). Next, the joined samples were rinsed and placed in a bath prepared to contain 2% dye on weight of fabric of Acid Blue 45 and adjusted to pH 5.8. Dyeing was continued for 90 minutes total at 100° C. The competitively dyed joined samples were rinsed dried and each sample measured again on the MACBETH Laboratories eye reflectance colorimeter for K/S and color depth by the known method. The K/S value is the well-known Kubelka-Munk absorption-scattering factor and equal to $[(1-R)^2/2R]$, where R is the fraction of light reflected at the maximum absorption wavelength from the dyed sample. The color depth is calculated in the known manner alternatively as a chromatic measurement (i.e. at a single wavelength) or as an apparent measurement (i.e. averaged over all the visible wavelengths) and setting the control measurement to 100% color depth in either case.

The results of the heat set fabric whiteness measurements are presented in Table 1. The data show that the Invention fabric, the sample treated with aqueous potassium thiocyanate, has a superior retained whiteness compared with the Control based on the W values. Higher values for W indicate a whiter fabric. Conversely, the Invention fabric yellowed less than the Control while heat setting. The yellowness comparison is based on the b or Y values. Lower values of Y are less yellow.

TABLE 1

| Fabric Sample (heat set and un-dyed) | L | a | b | W 'whiteness' | Y 'yellowness' |
|---|---|---|---|---|---|
| Control | 94.33 | −1.65 | 6.15 | 53.82 | 10.76 |
| Invention | 92.37 | −1.87 | 3.76 | 63.93 | 6.22 |

The results of the heat set and dyed fabric color depth are presented in Table 2. Visual rating of the Invention fabric compared to the Control was striking. No dye resistant yarns (light dye ends) were visible in the potassium thiocyanate treated fabric, whereas the control fabric exhibited a number of undesirable light dyeing ends across the width of the fabric, about 10 per 60 inch width. The ratio of K/S values at the absorption peak for Acid Blue 45 multiplied by 100 is the chromatic color depth. The data in Table 2 show the Invention fabric dyes about 80% darker than the Control fabric, based on chromatic or apparent color depth comparisons.

TABLE 2

| Fabric Sample (heat set and dyed) | K/S | Chromatic color depth (660 nm) | Apparent color depth (400–700 nm) |
|---|---|---|---|
| Control | 3.39 | 100% | 100% |
| Invention | 6.24 | 184% | 178% |

Example 2

In this example, a white woven flag fabric from 200 denier 34 filament (5.9 denier per filament) nylon 66 yarn (DuPont T185) was treated alternatively with potassium, sodium, lithium, or ammonium thiocyanate and subjected to heat treatment at each of six different temperatures. First, the fabric was pre-scoured in a jigger to remove size with an aqueous bath containing MERPOL HCS (1 gram/liter) and sodium carbonate (1 gram/liter) at 82° C. for 45 minutes.

For each thiocyanate treatment experiment, multiple samples of the pre-scoured fabric were taken, each sample measured 12 inches by 12 inches (929 cm$^2$). Six of the 12×12 square inch pieces were treated in an aqueous bath with potassium thiocyanate at a concentration of 5 grams per liter and a pH of 4.0 adjusted with acetic acid for 60 minutes at 100° C. in a MATHIS LABOMAT dye machine. The liquor to goods ratio was 40:1. The treated samples were rinsed well with water. Six other 12×12 square inch pieces cut from the pre-scoured fabric remained untreated with thiocyanate and served as controls at each temperature.

After thiocyanate treatment the treated samples and the controls were reductively scoured using 5 grams/liter of POLYCLEAR NPH at 88° C. for 30 minutes. All treated samples and the controls were rinsed well and air-dried. The six thiocyanate treated fabric samples and the six untreated controls were exposed to heat at six different temperatures: 177° C., 182° C., 188° C., 193° C., 199° C. and 204° C.; each for 45 seconds in a BENZ controlled temperature oven.

After heat treatment the whiteness retention of the fabric samples was measured. The treated samples and their respective controls at each temperature were measured individually for whiteness, W, and yellowness, Y, by first determining their CIE color coordinates: L, a, b; according to the methods of Example 1.

The results of Example 2, a treatment experiment of the woven flag fabric with potassium thiocyanate are reported in Table 3. A treatment experiment of the same. fabric with ammonium thiocyanate are reported in Table 4, with sodium thiocyanate are reported in Table 5 and with lithium thiocyanate are reported in Table 6.

TABLE 3

Example 2 - Potassium Thiocyanate.

| Heat treatment temp. | Color coordinate L Invention/ control | Color coordinate a Invention/ control | Color coordinate b Invention/ control | Whiteness W Invention/ control | Yellowness Y Invention/ control |
|---|---|---|---|---|---|
| 177° C. | 87.73/ 87.82 | −0.52/−0.72 | 1.26/1.39 | 65.37/64.91 | 2.49/2.61 |
| 182° C. | 87.53/ 87.56 | −0.52/−0.86 | 1.25/1.63 | 65.06/63.11 | 2.48/3.00 |

TABLE 3-continued

Example 2 - Potassium Thiocyanate.

| Heat treatment temp. | Color coordinate L Invention/ control | Color coordinate a Invention/ control | Color coordinate b Invention/ control | Whiteness W Invention/ control | Yellowness Y Invention/ control |
|---|---|---|---|---|---|
| 188° C. | 87.50/ 87.50 | −0.60/−1.17 | 1.65/3.23 | 63.00/55.24 | 3.24/6.00 |
| 193° C. | 87.33/ 87.15 | −0.64/−1.26 | 1.90/4.32 | 61.42/49.11 | 3.72/8.15 |
| 199° C. | 87.26/ 87.24 | −0.70/−1.36 | 2.35/7.21 | 59.06/32.78 | 4.60/13.89 |
| 204° C. | 87.30/ 85.82 | −0.71/−1.17 | 2.49/9.30 | 58.47/21.45 | 4.87/18.17 |

TABLE 4

Example 2 - Ammonium Thiocyanate.

| Heat treatment temp. | Color coordinate L Invention/ control | Color coordinate a Invention/ control | Color coordinate b Invention/ control | Whiteness W Invention/ control | Yellowness Y Invention/ control |
|---|---|---|---|---|---|
| 177° C. | 84.53/ 84.69 | −0.54/−0.57 | 0.76/0.68 | 67.55/68.21 | 1.52/1.33 |
| 182° C. | 84.45/ 84.42 | −0.55/−0.62 | 0.73/0.99 | 67.55/66.14 | 1.44/1.97 |
| 188° C. | 83.77/ 84.40 | −0.66/−0.75 | 1.11/1.14 | 64.35/63.77 | 2.23/2.85 |
| 193° C. | 84.21/ 84.45 | −0.71/−1.03 | 1.30/2.40 | 64.16/58.79 | 2.58/4.74 |
| 199° C. | 84.19/ 84.02 | −0.75/−1.13 | 1.53/2.91 | 62.90/55.26 | 3.07/5.81 |
| 204° C. | 83.75/ 83.62 | −0.87/−1.42 | 2.06/4.99 | 59.30/43.15 | 4.17/10.24 |

TABLE 5

Example 2 - Sodium Thiocyanate.

| Heat treatment temp. | Color coordinate L Invention/ control | Color coordinate a Invention/ control | Color coordinate b Invention/ control | Whiteness W Invention/ control | Yellowness Y Invention/ control |
|---|---|---|---|---|---|
| 177° C. | 87.80/ 87.98 | −0.57/−0.75 | 1.05/1.01 | 66.56/67.11 | 2.01/1.79 |
| 182° C. | 87.83/ 87.88 | −0.26/−0.77 | 0.64/1.21 | 67.89/65.91 | 1.49/2.18 |
| 188° C. | 87.75/ 87.90 | −0.65/−0.99 | 1.21/1.90 | 65.63/62.62 | 2.29/3.42 |
| 193° C. | 87.68/ 87.87 | −0.67/−1.28 | 1.45/3.20 | 64.33/56.22 | 2.77/5.83 |
| 199° C. | 87.54/ 87.14 | −0.81/−1.67 | 2.02/5.80 | 61.23/41.81 | 3.84/10.76 |
| 204° C. | 86.94/ 85.81 | −0.40/−1.56 | 3.74/10.46 | 51.57/15.64 | 7.71/20.04 |

TABLE 6

Example 2 - Lithium Thiocyanate.

| Heat treatment temp. | Color coordinate L Invention/ control | Color coordinate a Invention/ control | Color coordinate b Invention/ control | Whiteness W Invention/ control | Yellowness Y Invention/ control |
|---|---|---|---|---|---|
| 177° C. | 84.51/ 84.81 | −0.58/−0.76 | 0.70/0.96 | 67.78/66.95 | 1.36/1.78 |
| 182° C. | 84.97/ 84.42 | −0.67/−0.82 | 0.80/0.78 | 67.55/67.20 | 1.73/1.34 |
| 188° C. | 84.49/ 84.54 | −0.76/−1.01 | 1.18/1.45 | 65.27/63.95 | 2.27/2.65 |
| 193° C. | 84.43/ 84.49 | −0.86/−1.12 | 1.15/1.87 | 65.42/61.43 | 2.93/3.49 |
| 199° C. | 84.31/ 84.29 | −0.97/−1.23 | 2.10/2.26 | 60.11/59.21 | 4.14/4.27 |
| 204° C. | 84.15/ 83.73 | −1.08/−1.58 | 2.89/5.10 | 55.64/42.71 | 5.80/10.35 |

The results presented in Tables 3–6 illustrate the effect of thiocyanate treatment using sources of thiocyanate anion with four different cations on retained fabric whiteness over a range of thermal exposures. The CIE color coordinate (b) is indicative of fabric yellowing and the derived Whiteness value(W) measures whiteness. It is clear from these measurements that superior whiteness retention after heat treatment is conferred to nylon fabric treated with thiocyanate anion with various cations.

The data show that the Invention fabric has a superior retained whiteness compared with the control based on the W values, higher values indicating a whiter fabric. Conversely, the Invention fabric yellowed less than the control while heat setting.

Figure 2:
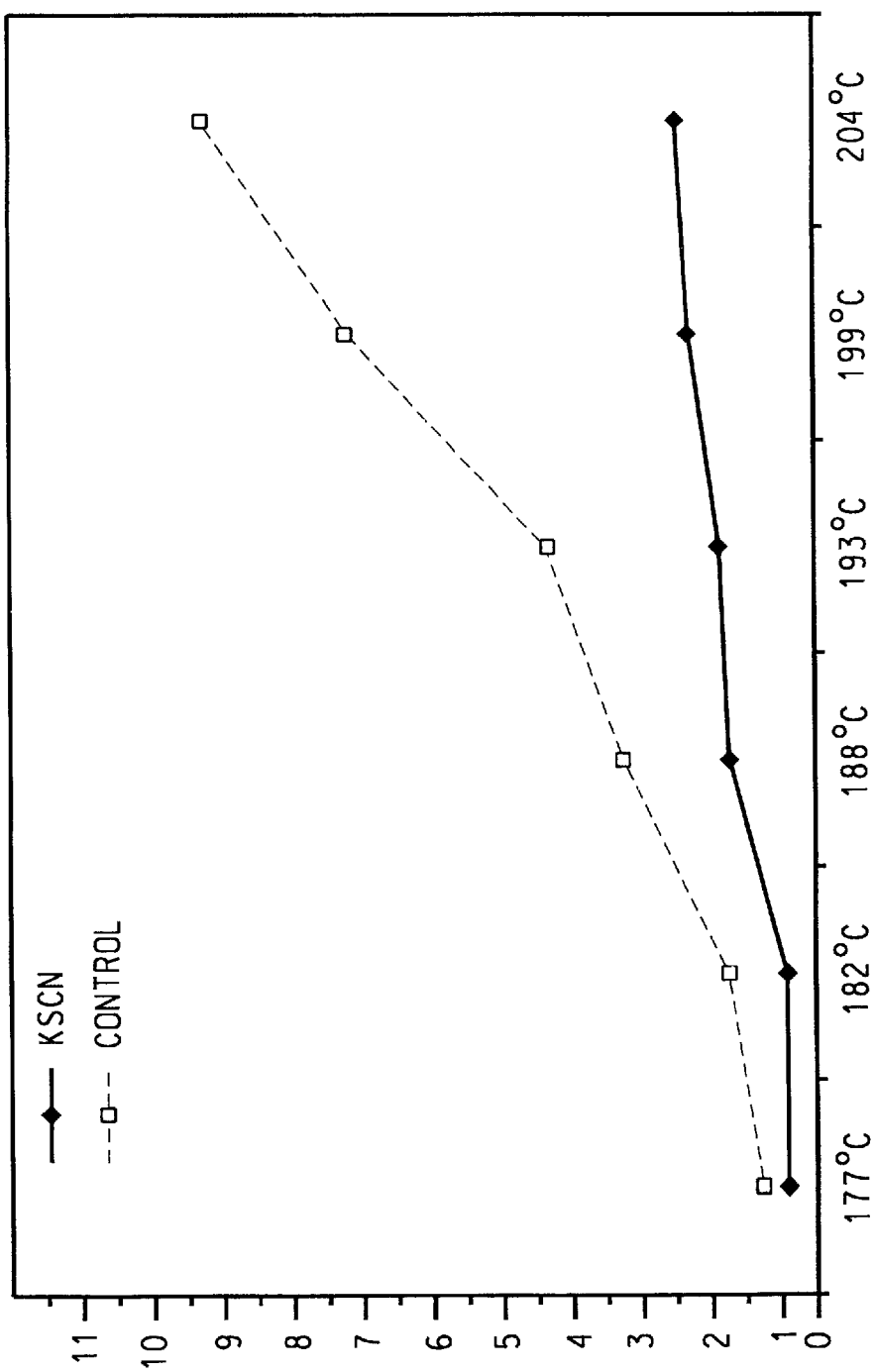
FIG. 2 is a graph showing the CIE color coordinate, b, versus heat setting temperature for a potassium thiocyanate treated sample of the invention and a control.
Figure 3:
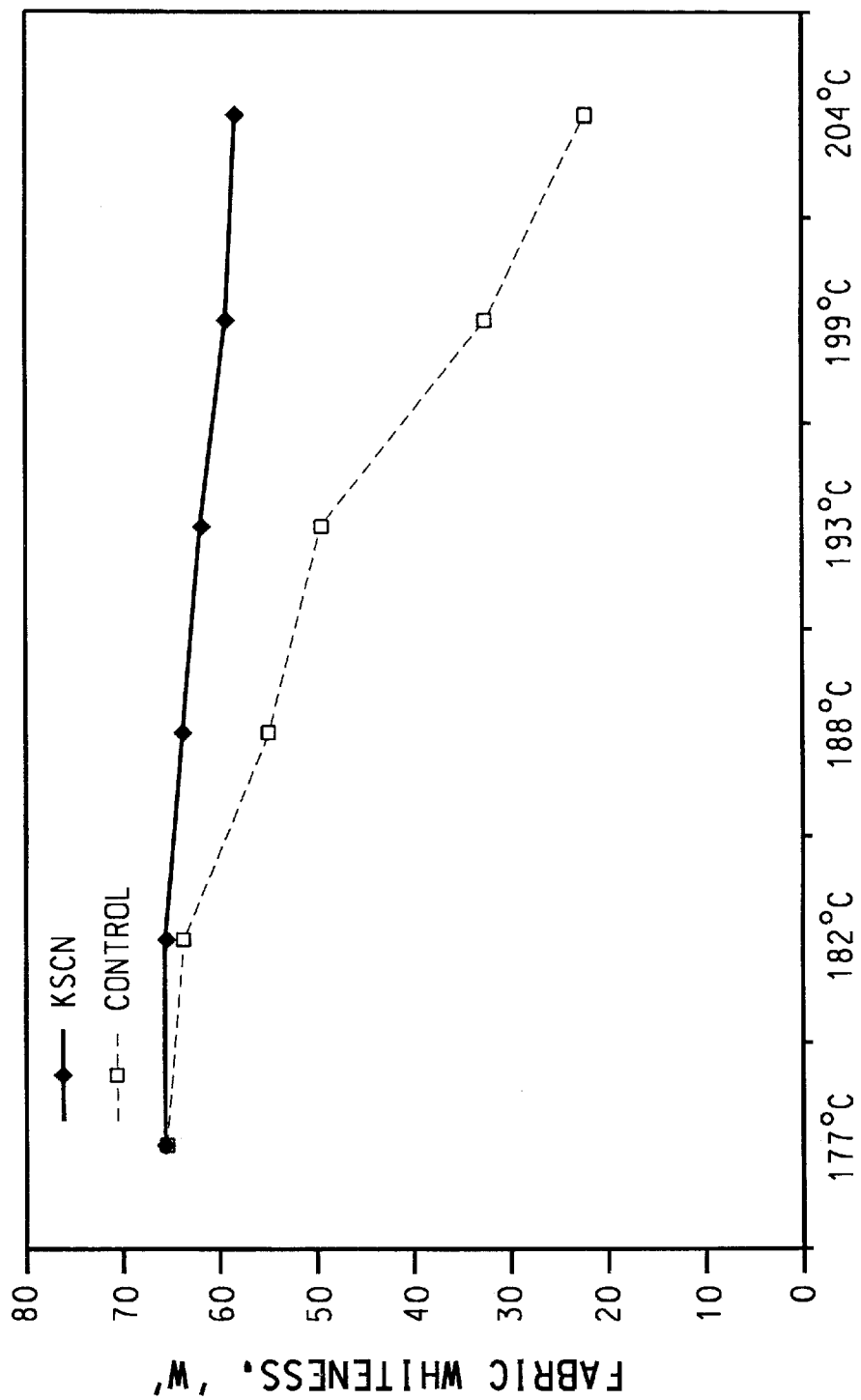
FIG. 3 is a graph showing the derived whiteness value, W, versus heat setting temperature for a potassium thiocyanate treated sample of the invention and a control.

Selected data in Table 3, for potassium thiocyanate (KSCN) treatment, are presented graphically in FIGS. 2 and 3. In FIG. 2, the CIE color coordinate b is plotted for the 6 temperatures. The b value for the KSCN treated fabric changes little at the two lowest temperatures and increases to slightly less than 2 times the lowest temperature value at the highest temperature of exposure. By contrast, FIG. 2 shows the control fabric b value increases steadily to a value of about 6 and one-half times the value measured at the lowest temperature of exposure.

In FIG. 3 the derived whiteness value, W, is plotted for the 6 temperatures. The W value for the KSCN treated fabric changes little at the two lowest temperatures and decreases at the highest temperature of exposure by only about 10% of its value at the lowest temperature. By contrast, FIG. 2 shows the control fabric W value decreased steadily to a value at the highest exposure temperature of only ⅓ that measured at the lowest temperature of exposure.

Example 3

In this example, nylon 66 polymer chips (each chip is roughly a right cylinder of about 6 mm length and about 4 mm diameter) were treated with aqueous potassium thiocyanate under conditions similar to those used in Example 2. First, the polymer chips were treated in an aqueous bath with potassium thiocyanate at a concentration of 10 grams per liter and a pH of 4.0, adjusted with acetic acid, for 120 minutes at 110° C. in a MATHIS LABOMAT dye machine. The treated polymer chips were rinsed well with water. An equal weight of polymer chips was reserved for the control. The control chips remained untreated with potassium thiocyanate. After thiocyanate treatment the polymer chips were scoured using 10 grams/liter of POLYCLEAR NPH at 100° C. for 45 minutes. The treated polymer samples were rinsed well and air-dried.

The polymer chips were placed in the hopper of a screw melt extruder, blanketed with dry nitrogen, and fed to a multifilament yarn-spinning machine. The melted nylon polymer was forced through a filter pack and spinneret plate with 17 round holes to form a plurality of filaments, which were air-quenched, converged into a yarn and oiled with a fiber finish. This yarn was forwarded to a draw roll assembly and drawn 2.5 times and wound into a yarn package at 3000 meters per minute. The prepared yarn package (50 denier and 17 filaments) was knit into tube-like structures resembling hosiery for further testing. One or more control samples of the same chips were used to prepare multifilament yarns and knit tubes in the same way as the thiocyanate treated chips.

Four samples each of treated and untreated nylon polymer yarn tubes were reserved for heat treatment at each of four temperatures: 188° C., 193° C., 199° C. and 204° C. in the heat setting oven of Example 1. The yarns from the treated polymer and the control, prepared as above, and knit into tubes were dyed using the same procedure as Example 1. Dyeability was measured as in Example 1, based on K/S value for the dyed samples and their controls. Greige yarn knit tubes served as the reference (100% retained dyeability) for the thiocyanate treated and untreated polymer. The dyeability loss upon heat exposure was measured as a percentage of the original dyeability (K/S of the greige yarn tube as measured with no heat treatment)

Figure 4:
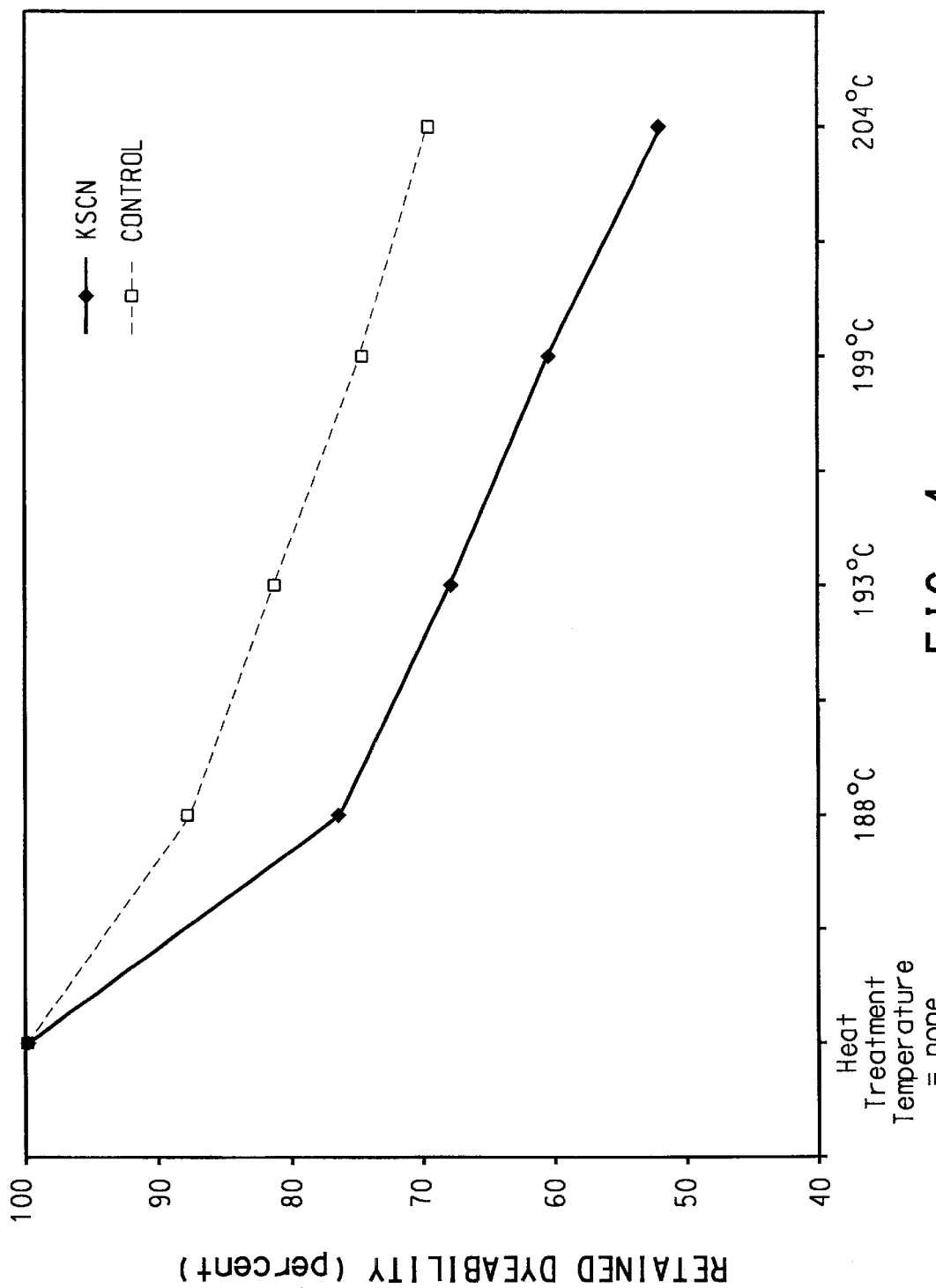
FIG. 4 is a graph showing the retained dyeability versus heat setting temperature for a potassium thiocyanate treated sample of the invention and a control.

A first nylon 66 polymer chip type used in this example, called Type A, had an amine end group concentration of 78 amine end gram equivalents per 1000 kilograms of polymer, determined in a known manner by titration. The amine end groups are dye sites for typical acid dyes used with nylon. The dyeability results are reported in Table 7 and the retained dyeability is illustrated by way of FIG. 4. In FIG. 4, the retained dyeability is a ratio, expressed as percent, of the K/S value for the greige sample (denominator) and the post heat treatment K/S value (numerator)

TABLE 7

| Polymer type | K/S (treatment temp. = none) | K/S (treatment temp. = 188° C.) | K/S (treatment temp. = 193° C.) | K/S (treatment temp. = 199° C.) | K/S (treatment temp. = 204° C.) |
|---|---|---|---|---|---|
| A control | 23.3 | 17.9 | 15.8 | 14.1 | 12.1 |
| A KSCN treated | 24.7 | 21.7 | 20.0 | 18.4 | 17.2 |

In FIG. 4 the round data points represent the control. The KSCN treated sample is shown as square data points. Versus the controls the dyeability of the thiocyanate treated polymer is preserved after heat exposure over the useful range of temperatures employed to heat set nylon containing fabrics. This fact is striking in view of the thiocyanate treatment to the polymer taking place prior to spinning filaments.

Figure 5:
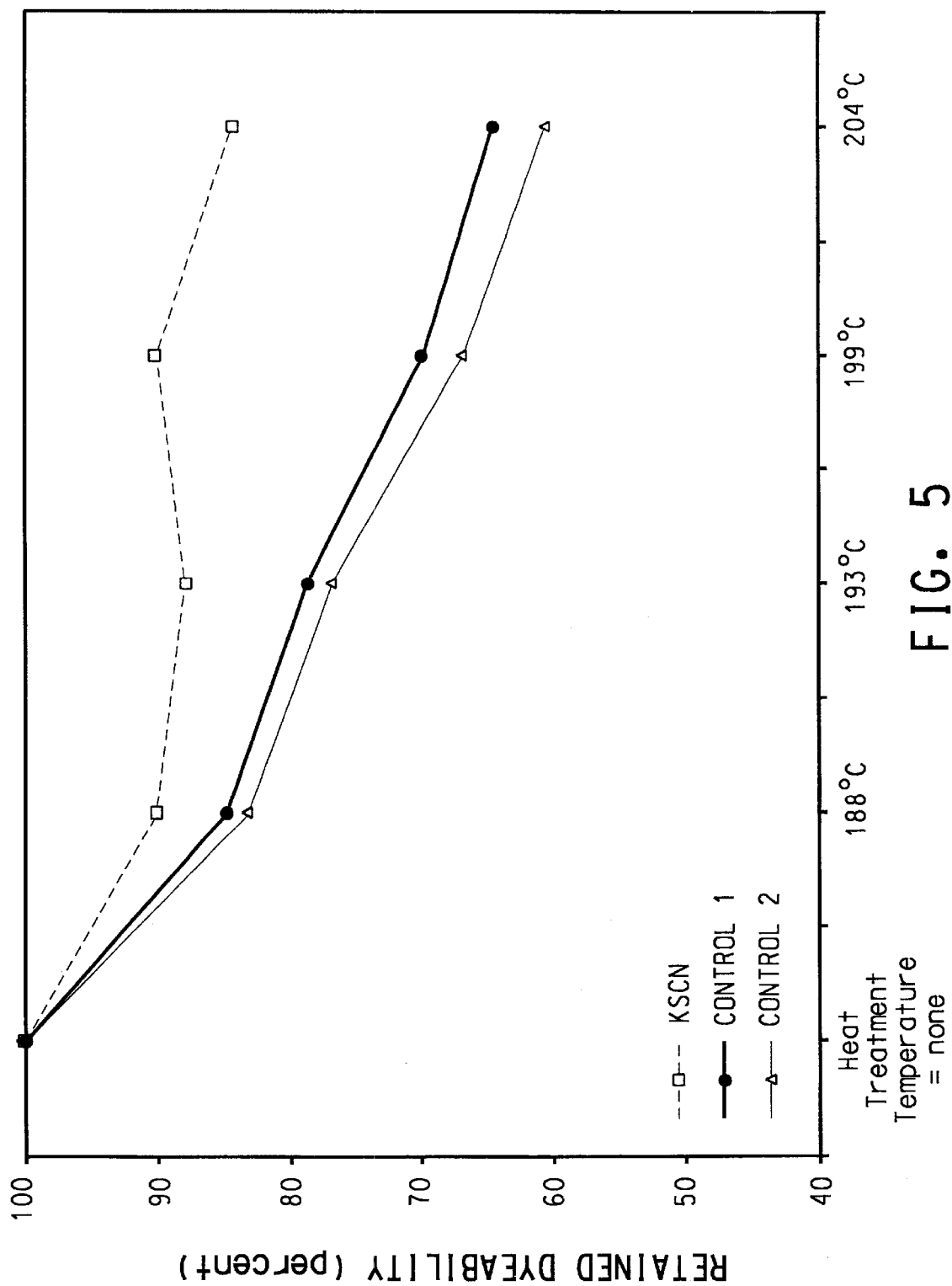
FIG. 5 is a graph showing retained dyeability versus heat setting temperature for a potassium thiocyanate treated polyamide of the invention, control I, and control II.

A second nylon 66 polymer chip type used in this example, called Type B, had an amine end group concentration of 62 amine end gram equivalents per 1000 kilograms of polymer, determined in the known manner by titration. The dyeability results are reported in Table 8 and the retained dyeability is illustrated by way of FIG. 5. In FIG. 5, the retained dyeability is a ratio, expressed as percent, of the K/S value for the greige sample (denominator) and the post heat treatment K/S value (numerator).

TABLE 8

| Polymer type | K/S (treatment temp. = none) | K/S (treatment temp. = 188° C.) | K/S (treatment temp. = 193° C.) | K/S (treatment temp. = 199° C.) | K/S (treatment temp. = 204° C.) |
|---|---|---|---|---|---|
| B Control I | 26.6 | 22.5 | 20.8 | 18.6 | 17.0 |
| B Control II | 27.5 | 22.8 | 21.1 | 18.4 | 16.6 |
| B KSCN treated | 26.1 | 23.5 | 22.9 | 23.6 | 21.9 |

In FIG. 5 the round and open triangle data points are Control I and Control II respectively. The KSCN treated sample is shown as square data points. Versus the controls the dyeability of the thiocyanate treated polymer is preserved after heat exposure over the useful range of temperatures employed to heat set nylon containing fabrics. This fact is striking in view of the thiocyanate treatment to the polymer occurring prior to spinning filaments.

A third nylon 66 polymer chip type used in this example, called Type C, had an amine end group concentration of 78 amine end gram equivalents per 1000 kilograms of polymer, determined in a known manner by titration. The dyeability results are reported in Table 9 along with the retained dyeability. The retained dyeability is a ratio, expressed as percent, of the K/S value for the greige sample (denominator) and the post heat treatment K/S value (numerator).

TABLE 9

| Polymer type | K/S (treatment temp. = none) | K/S (treatment temp. = 188° C.) | K/S (treatment temp. = 193° C.) | K/S (treatment temp. = 199° C.) | K/S (treatment temp. = 204° C.) |
|---|---|---|---|---|---|
| C Control | 18.3 | 13.2 | 11.5 | 10.2 | 8.3 |
| C KSCN treated | 19.3 | 16.4 | 15.6 | 14.7 | 12.7 |
| | Retained dyeability (treatment temp. = none) | Retained dyeability (treatment temp. = 188° C.) | Retained dyeability (treatment temp. = 193° C.) | Retained dyeability (treatment temp. = 199° C.) | Retained dyeability (treatment temp. = 204° C.) |
| C Control | 100 | 72.13 | 62.84 | 55.74 | 45.36 |
| C KSCN treated | 100 | 84.97 | 80.83 | 76.17 | 65.80 |

A fourth nylon 66 polymer chip type used in this example, called Type D, had an amine end group concentration of 58 amine end gram equivalents per 1000 kilograms of polymer, determined in a known manner by titration. The dyeability results are reported in Table 10 along with the retained dyeability. The retained dyeability is a ratio, expressed as percent, of the K/S value for the greige sample (denominator) and the post heat treatment K/S value (numerator).

TABLE 10

Polymer type

|  | K/S (treatment temp. = none) | K/S (treatment temp. = 188° C.) | K/S (treatment temp. = 193° C.) | K/S (treatment temp. = 199° C.) | K/S (treatment temp. = 204° C.) |
|---|---|---|---|---|---|
| D Control | 23.6 | 20.4 | 18.6 | 17.6 | 15.6 |
| D KSCN treated | 22.2 | 22.1 | 20.4 | 20.5 | 19.8 |
|  | Retained dye-ability (treatment temp. = none) | Retained dye-ability (treatment temp. = 188° C.) | Retained dye-ability (treatment temp. = 193° C.) | Retained dye-ability (treatment temp. = 199° C.) | Retained dye-ability (treatment temp. = 204° C.) |
| D Control | 100 | 86.44 | 78.81 | 74.58 | 66.10 |
| D KSCN treated | 100 | 99.55 | 91.89 | 92.34 | 89.19 |

The data in Tables 9 and 10 illustrate again that amine end group loss from polyamides after heat exposure is reduced by the thiocyanate treatment process of this invention. Regardless of the starting amine end group concentration in the polyamide polymer, retained color depth in the thiocyanate treated polyamide polymer is superior to the control untreated polymer.

Example 4

A 200 denier (34 filaments) nylon 6 (polycaproamide) yarn was woven into a fabric. The fabric was divided into equal area samples for thiocyanate treatment and similar samples were reserved for controls. All samples were pre-scoured using 1 gram per liter of aqueous sodium carbonate with 1 gram per liter of Merpol HCS in a MATHIS LABOMAT for 30 minutes at 88° C. (300 grams of sample in 4 liters of pre-scour bath). All samples were rinsed and allowed to air dry.

Control pre-scoured samples were reductively scoured using 5 grams per liter POLYCLEAR NPH at 88° C. for 30 minutes. These control samples were rinsed and allowed to air dry.

The pre-scoured test samples were treated with 5 grams per liter of aqueous potassium thiocyanate (KSCN) at 100° C. and pH 4.0 (adjusted with acetic acid) for 60 minutes. The KSCN samples were rinsed and reductively scoured using 5 grams per liter POLYCLEAR NPH at 88° C. for 30 minutes. The treated samples were rinsed and allowed to air dry. All were heat exposed at different temperatures (at 177° C., 182° C., 188° C., 193° C., 199° C., 204° C.) as before in the BENZ oven for 45 seconds. Using the methods of Example 1, these control samples were measured for CIE color coordinates L, a, and b and the whiteness, W, and yellowness, Y, values derived as before.

TABLE 11

| temperature | L (invention/ control) | a (invention/ control) | b (invention/ control) | W (invention/ control) | Y (invention/ control) |
|---|---|---|---|---|---|
| 177° C. | 87.33/ 87.39 | −0.64/−0.71 | 0.99/1.51 | 65.84/63.43 | 1.84/2.86 |
| 182° C. | 87.08/ 87.19 | −0.68/−0.72 | 1.15/1.78 | 64.54/61.68 | 2.14/3.42 |
| 188° C. | 87.31/ 87.38 | −0.73/−0.85 | 1.62/1.92 | 62.71/61.39 | 3.08/3.60 |
| 193° C. | 87.13/ 87.48 | −0.69/−0.85 | 1.44/1.81 | 63.23/62.13 | 2.74/3.73 |
| 199° C. | 86.97/ 87.24 | −0.79/−0.91 | 1.92/2.56 | 60.53/57.96 | 3.66/4.87 |
| 204° C. | 86.79/ 86.91 | −0.84/−1.03 | 2.44/3.79 | 57.58/51.24 | 4.69/7.28 |

The data in Table 11 indicate the thiocyanate treatment protects nylon 6 from loss of whiteness under heat setting conditions. With reference to the column headed W in Table 9, the invention lost whiteness at the highest temperature 204° C. but the whiteness was still 87% of the value at the lowest temperature 177° C. By contrast, the control lost whiteness at the highest temperature 204° C. but the whiteness was 80% of the value at the lowest temperature 177° C.

Here the yellowness (column headed Y in Table 11) comparison between the invention and the control is striking. The control was one and one half times more yellow at the lowest temperature 177° C. versus the invention. At the highest heat exposure temperature 204° C., the invention was 2.5 times more yellow than its starting point at 177° C. The control was 3.9 times more yellow at 204° C. versus the invention at 177° C.

Example 5

A nylon 66 40 denier yarn with 13 filaments and containing 30 denier DuPont LYCRA® spandex monofilaments in 20 weight percent was taken in fabric form and exposed to aqueous potassium thiocyanate (KSCN) over a range of concentration from 0.20% to 10% based on weight of KSCN on weight of fabric. Untreated samples were reserved for measurements of L, a, b, W, Y, K/S, apparent color strength and chromatic color strength. The control measurements are taken to define 100% apparent color strength, as in Example 1. Samples were pre-scoured as in Example 2 before, and each thiocyanate treated sample was exposed to the KSCN solution at pH 4.0 for 60 minutes at 60° C. The treated samples and controls were all heat set at 193° C. for 45 seconds. Samples were dyed as before using dye conditions of Example 1.

TABLE 12

| SAMPLE | K/S | Color Strength Apparent | Color Strength Chromatic |
|---|---|---|---|
| Control I | 12.12 | 100.0 | 100.0 |
| 0.2% KSCN | 12.77 | 106.28 | 105.35 |
| 0.4% KSCN | 13.02 | 108.65 | 107.41 |
| 0.6% KSCN | 13.63 | 113.35 | 112.47 |
| 0.8% KSCN | 14.09 | 117.65 | 116.28 |
| Control II | 12.12 | 100.0 | 100.0 |
| 1.0% KSCN | 13.91 | 116.28 | 114.80 |
| 2.0% KSCN | 14.14 | 117.47 | 116.66 |
| 4.0% KSCN | 14.50 | 120.34 | 119.75 |

TABLE 12-continued

| SAMPLE | K/S | Color Strength Apparent | Color Strength Chromatic |
|---|---|---|---|
| 8.0% KSCN | 14.70 | 122.05 | 121.56 |
| 10.0% KSCN | 14.76 | 123.68 | 121.76 |
| Control III | 12.30 | 100.0 | 100.0 |

Figure 6:
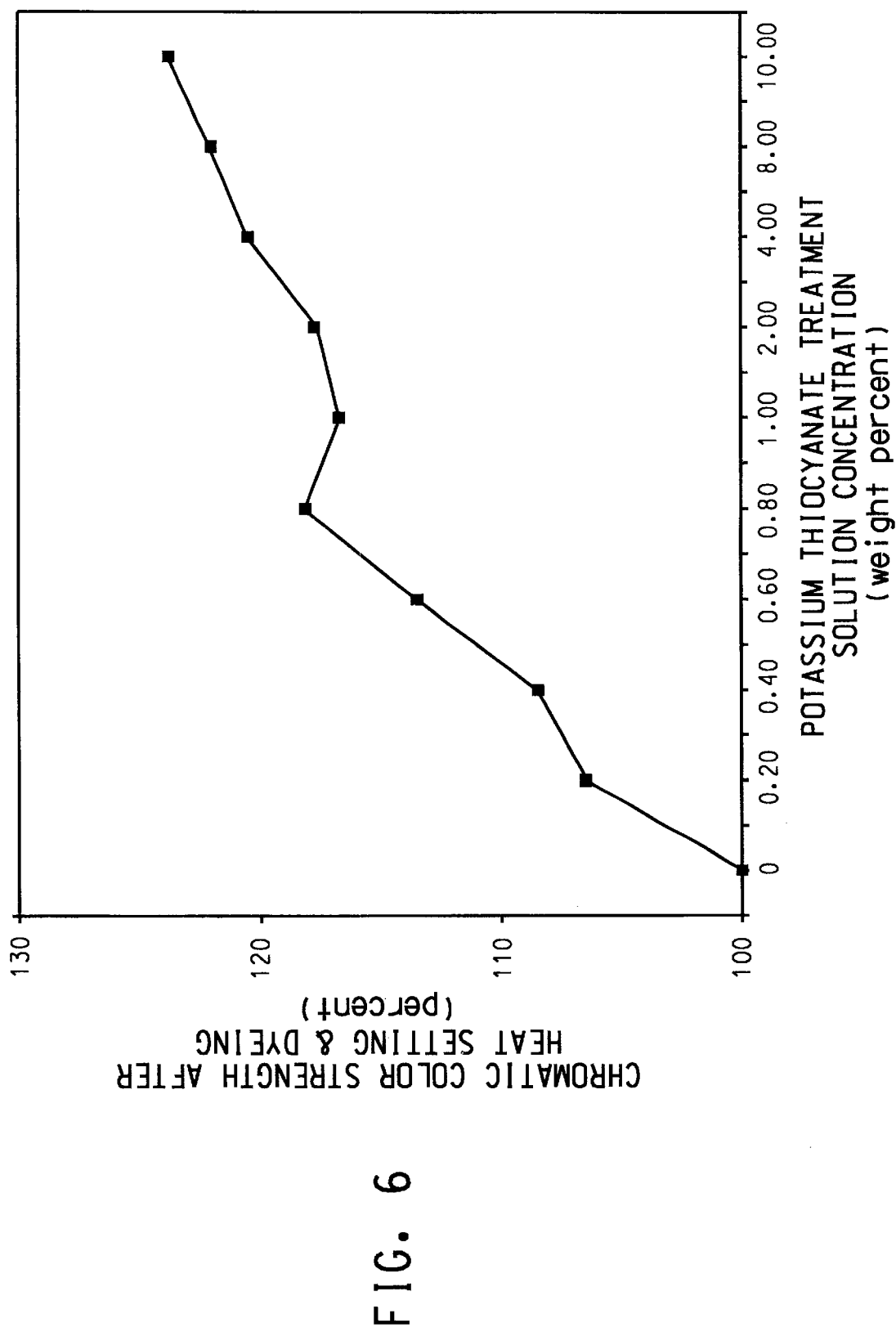
FIG. 6 is a graph showing the chromatic color strength for thiocyanate treated fabrics after heat setting and dyeing, according to the invention.

Table 12 presents the post heat setting and dyeing K/S values as measured along with the apparent color strength and the chromatic color strength, as described previously. FIG. 6 summarizes the chromatic color strength data. Here the chromatic color strength is calculated as it was in Example 1. These data show the thiocyanate treated fabric dyes with enhanced color depth after heat treatment versus the control untreated fabrics. Thiocyanate treatment provides a means to prevent color depth loss observed in heat treated nylon containing polyamides, such as those polyamides with a portion of spandex filaments.

Example 6

A nylon 66 40 denier yarn with 13 filaments and containing 30 denier DuPont LYCRA® spandex monofilaments in 20 weight percent was taken in knit fabric form and contacted with 5 grams per liter aqueous potassium thiocyanate (KSCN) at pH 4.0 for 60 minutes at 60° C. An untreated fabric sample was reserved for a control. The KSCN treated and untreated control samples were heat set at 199° C. for 45 seconds. All the samples were pre-scoured in an aqueous bath with 1 gram per liter sodium carbonate and 0.5 grams per liter MERPOL HCS for 30 minutes at 71° C.

Twelve equal area fabric samples were taken for dye tests from each of the KSCN treated and the untreated control samples. A first set of six KSCN treated samples were dyed with six different fiber reactive STANALAN® dyes manufactured by DYSTAR AG and a set of six control samples were dyed the same way. Six more of the KSCN treated samples were dyed with six different acid dyes and the final six untreated samples were acid dyed accordingly.

The first set of six KSCN treated samples were dyed from an aqueous dye bath with 4% STANALAN dye (using 6 different dyes) at 100° C. for 60 minutes at pH 4.0 (established using monosodium phosphate and acetic acid) and 0.5% SANDOGEN NH. The set of six control samples were dyed as the KSCN treated samples. All samples were scoured after dyeing using an aqueous bath of 1 gram per liter sodium carbonate at 65° C. for 20 minutes. An aqueous after treatment was given to all samples using 2% ERIONAL PA at pH 4.0 and 77° C. for 20 minutes. K/S was determined for all samples, in the manner of Example 1, and the chromatic and apparent color strengths for each sample calculated accordingly taking the untreated control sample as 100%. The data are recorded in Table 13.

The data in Table 13 shows that in every case with fiber reactive dyes, at least a 20% improvement in color depth of dyeing is achieved on thiocyanate treated and heat set fabrics versus the untreated samples.

TABLE 13

| Sample (invention = KSCN treated) | Dye fiber reactive type | K/S at max. wavelength | Color strength Chromatic | Color strength Apparent |
|---|---|---|---|---|
| Control | STANALAN Yellow MFFR | 17.51 | 100 | 100 |
| Invention | STANALAN Yellow MFFR | 21.11 | 120.53 | 123.31 |
| Control | STANALAN br. Blue MFFR | 14.93 | 100 | 100 |
| Invention | STANALAN br. Blue MFFR | 18.95 | 126.97 | 126.71 |
| Control | STANALAN Scarlet MFFN | 19.30 | 100 | 100 |
| Invention | STANALAN Scarlet MFFN | 24.14 | 125.08 | 127.02 |
| Control | STANALAN Navy MFFB | 15.67 | 100 | 100 |
| Invention | STANALAN Navy MFFB | 19.30 | 123.16 | 123.03 |
| Control | STANALAN dk. Red MFFN | 21.82 | 100 | 100 |
| Invention | STANALAN dk. Red MFFN | 26.44 | 121.21 | 123.14 |
| Control | STANALAN Grey MFFN | 17.51 | 100 | 100 |
| Invention | STANALAN Grey MFFN | 21.28 | 121.51 | 122.10 |

The second set of six KSCN treated samples, and their six untreated control samples were dyed from an aqueous dye bath with acid dyes at 100° C. for 60 minutes. For each of the 6 different acid dyes used, an aqueous dye bath was prepared using 1 gram per liter sodium carbonate, 0.75% SANDOGEN NH and 4 grams per liter CIBATEX AD-N and set at 27° C. and a pH of about 7.0. Next, the KSCN treated samples were added to the bath and conditioned for 5 minutes. Afterwards, the acid dye was added to the bath in the concentration indicated in Table 15. The bath temperature was ramped to 100° C. at a rate of rise of 1.7° C. per minute and maintained for 60 minutes. The bath was then cooled to 71° C. and the final pH of the bath recorded. The dye bath was drained and the dyed samples were rinsed with water and fixed with 4% aqueous ERIONAL PA at pH 4.5 and 77° C. for 20 minutes, rinsed again with water and dried. The set of six control samples were dyed as the KSCN treated samples with the same set of dyes. K/S was determined for all samples, in the manner of Example 1, and the chromatic and apparent color strengths for each sample calculated accordingly taking the untreated control sample as 100%. The data are recorded in Table 14.

The data in Table 14 shows that in every case with acid dyes, an improvement in color depth of dyeing is achieved on thiocyanate treated and heat set fabrics versus the untreated samples. Typically the improved color depth is 7% to 15% versus the controls.

TABLE 14

| Sample (invention = KSCN treated) | Dye acid type & concentration | Start pH/ end pH | K/S at max. wavelength | Color strength Chromatic | Color strength Apparent |
|---|---|---|---|---|---|
| Control | NYLOSAN violet F-BL 2% | 6.96/ 4.10 | 13.06 | 100 | 100 |
| Invention | NYLOSAN F-BL 2% | 6.96/ 4.10 | 14.60 | 111.80 | 110.45 |

TABLE 14-continued

| Sample (invention = KSCN treated) | Dye acid type & concentration | Start pH/ end pH | K/S at max. wavelength | Color strength Chromatic | Color strength Apparent |
|---|---|---|---|---|---|
| Control | INTRACID rhodamine B 1% | 6.81/ 4.08 | 8.51 | 100 | 100 |
| Invention | INTRACID rhodamine B 1% | 6.81/ 4.10 | 9.33 | 109.63 | 107.73 |
| Control | SUPRANOL navy R 1% | 6.72/ 4.12 | 25.43 | 100 | 100 |
| Invention | SUPRANOL navy R 1% | 6.72/ 4.08 | 28.95 | 113.84 | 112.73 |
| Control | NYLON turquoise GLM 2% | 6.76/ 4.10 | 29.64 | 100 | 100 |
| Invention | NYLON turquoise GLM 2% | 6.76/ 4.10 | 33.97 | 114.63 | 110.45 |
| Control | NYLANTHRENE yellow FLW 1.5% | 6.50/ 4.08 | 16.12 | 100 | 100 |
| Invention | NYLANTHRENE yellow FLW 1.5% | 6.50/ 4.14 | 18.74 | 116.21 | 115.17 |
| Control | ERIONYL red B 2% | 6.94/ 4.07 | 30.70 | 100 | 100 |
| Invention | ERIONYL red B 2% | 6.94/ 4.09 | 33.14 | 107.93 | 108.16 |

Example 7

In this example a nylon 66 polymer was made by heating a salt of one equivalent each of hexamethylene diamine and adipic acid in aqueous solution of 51.5% by weight concentration. Additional hexamethylene diamine was added to provide a 25 RV (RV refers to formic acid method of relative viscosity measurement; as provided by ASTM Method D 789-86), polymer with equal amounts of carboxyl and amine end groups. As a consequence, these conditions for polymerization yield a nylon 66 polymer with 100 gram equivalents of amine end groups per 1000 kilograms of polymer, determined in the known manner by titration.

Four polymer samples were prepared in the following way. A first 60.0 gram sample of salt solution was polymerized, to serve as a control, by heating from 120° C. to 200° C. where the temperature was held for 40 minutes (the autogenous pressure was about 1379 kilopascals and not vented). After ramping the temperature to 240° C. and holding for 60 minutes the vented pressure vessel was maintained at a pressure of 1724 kilopascals. The temperature was increased further to 275° C. and held there for 60 minutes additional during which time the pressure was released to the local atmospheric level. The vessel then was cooled to 25° C. from 275° C. over 60 minutes. The polymer was isolated, ground (comminuted) and sieved to obtain at least 10 grams of a uniform sample having a particle size in the range of 1.41 mm to 2.00 mm.

Two 5.0 gram samples of the polymer were taken for yellowness index measurements. One 5.0 gram sample served as a control and the other 5.0 gram sample was exposed to a flow of ambient air for 60 minutes at a temperature of 120° C. Yellowness index measurements were on the heat exposed sample and control sample.

The above polymerization experiment was repeated using a second, a third and a fourth 60.0 gram sample of nylon 66 salt solution. The second 60.0 gram sample included 0.0518 grams of potassium thiocyanate (KSCN), an amount equal to 0.20 of the final polymer amine end equivalents. The KSCN was dissolved completely in the nylon salt solution before the polymerization cycle was started. The third 60.0 gram sample included 0.2590 grams of potassium thiocyanate, an amount equal to the final polymer amine end equivalents. The fourth 60.0 gram sample included 0.5180 grams of potassium thiocyanate, an amount equal to 2.0 times the final polymer amine end equivalents.

Figure 7:
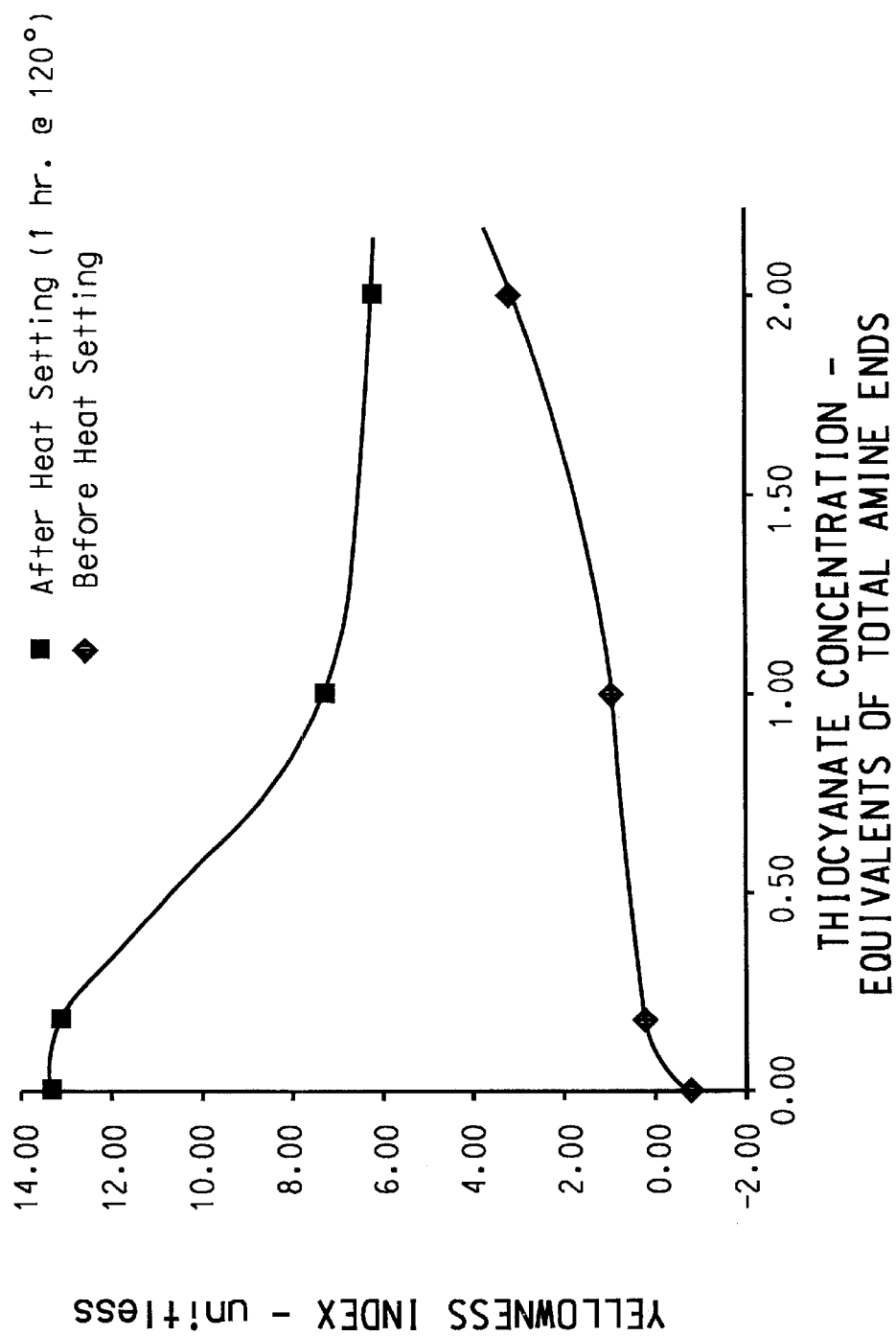
FIG. 7 is a graph showing yellowness, Y, versus thiocyanate concentration for a potassium thiocyanate treated polyamide of the invention.

The yellowness index measurements were determined on a HUNTERLAB ULTRASCAN Colorimeter calibrated against a whiteness standard prior to each measurement. The yellowness values reported are the mean of three presentations of the ground polymer with a physical depth of 5 mm against the instrument's standard, sample-holder white-panel background. The standard deviations of the color measurements ranged from 0.01 to 0.19. FIG. 7 summarizes the results. The square data points are for the heat exposed samples in each of the four pairs of polymer experiments. The diamond shape data points are for the control samples, that sample which was not heat exposed, of each of the four pairs of polymer experiments.

FIG. 7 illustrates the benefit of KSCN treatment in preventing polymer yellowing associated with heat exposure to the polymer. This benefit is notably achieved at a thiocyanate level about equal to the number of amine end groups, (a stoichiometric amount). Further addition of thiocyanate, for example above 1.5 times the stoichiometric amount provides a diminished effect on yellowing. This data also support the usefulness of adding KSCN to the nylon salt prior to polymerization in order to protect the polymer from developing an objectionable yellow hue.

Example 8

Figure 8:
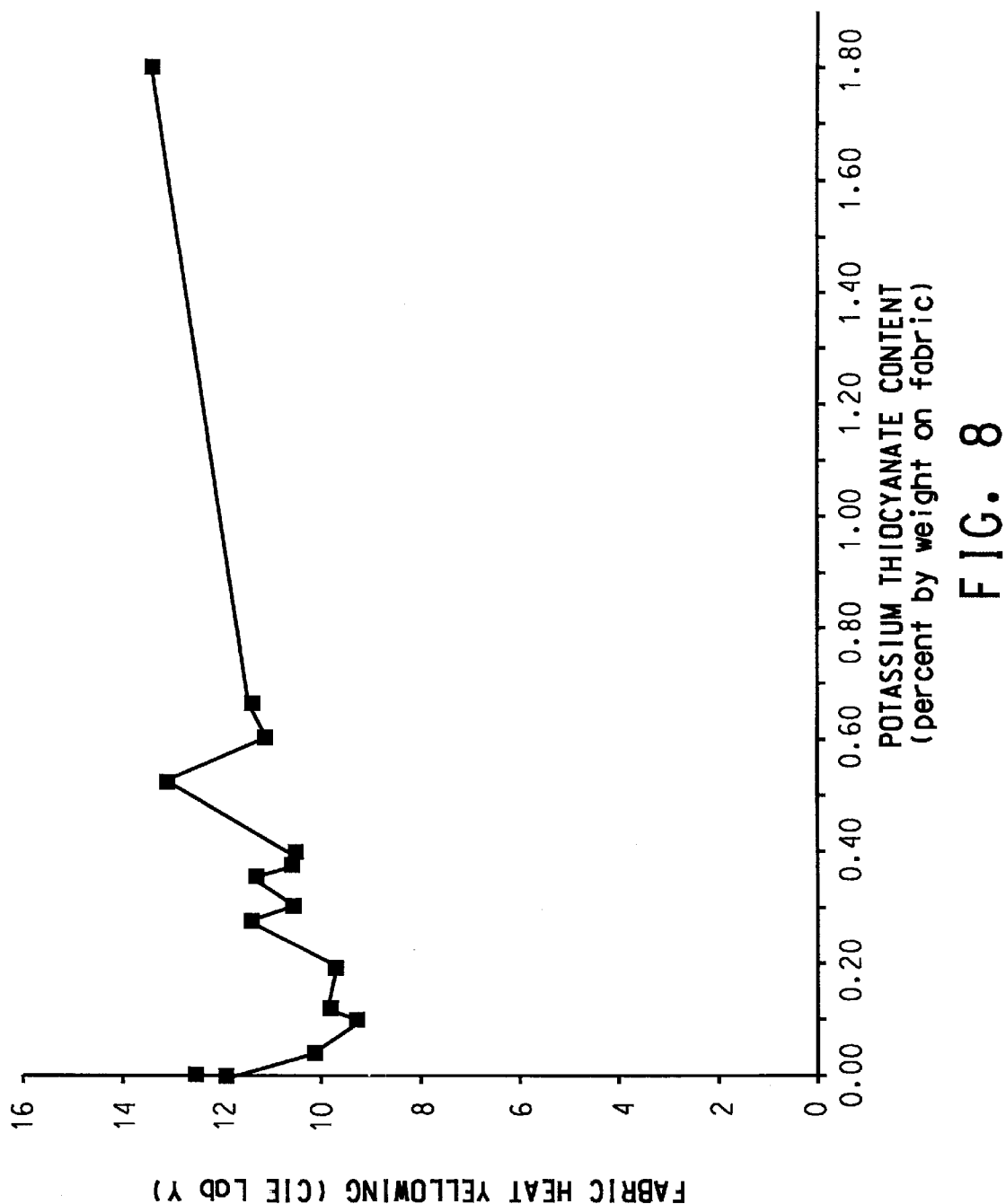
FIG. 8 is a graph showing yellowing, Y, versus potassium thiocyanate pad applied according to the invention.
Figure 9:
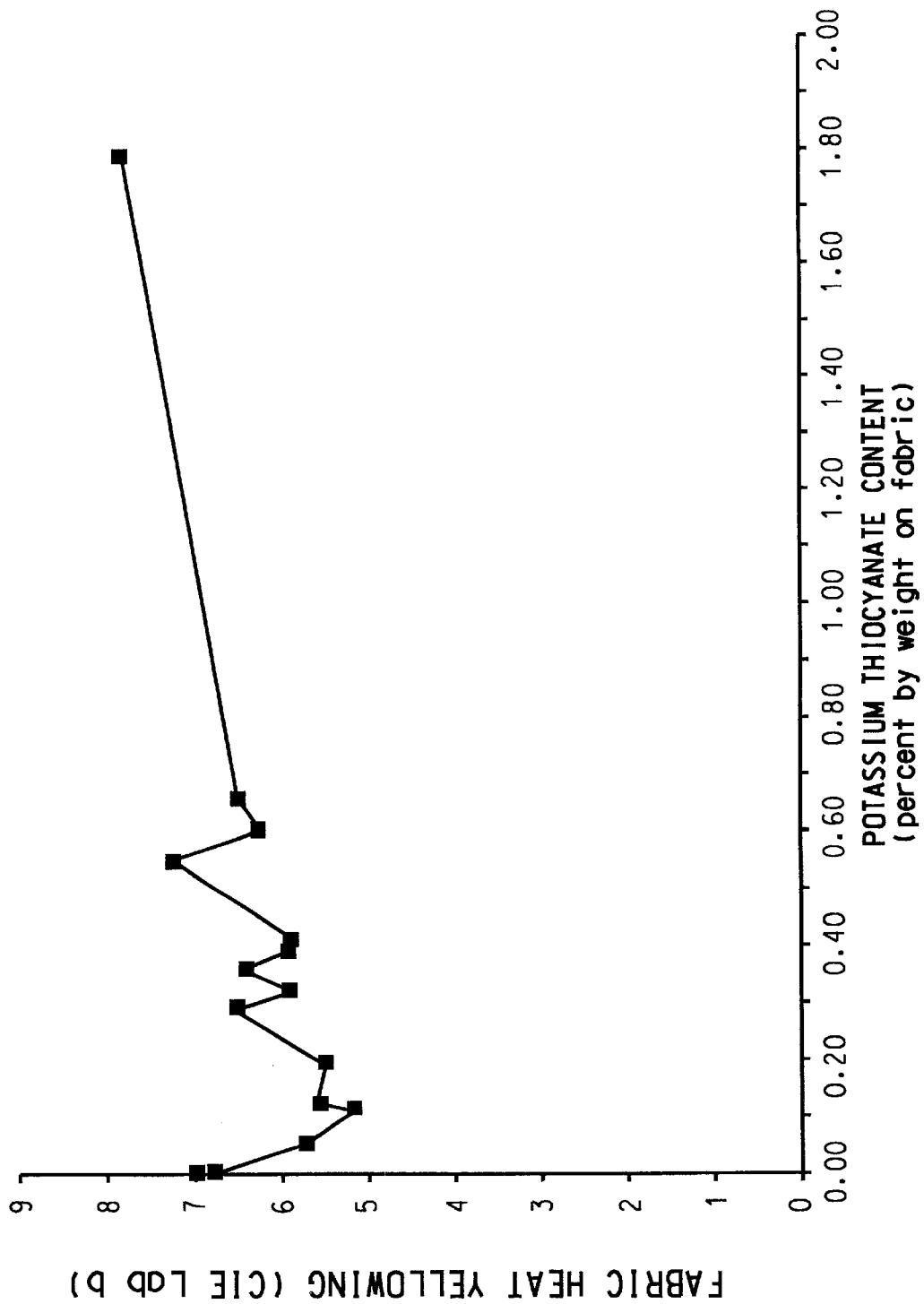
FIG. 9 is a graph showing the CIE b coordinate data versus potassium thiocyanate pad applied according to the invention.

A knit greige fabric from DuPont Type 6209 nylon 66 textured yarns of 70 denier with 68 round cross section filaments (1.03 denier per filament) was pad treated with aqueous potassium thiocyanate solution and then heat set at 120° C. for 60 minutes. This low temperature, long time heat setting simulates high temperature, low time treatment described earlier. Prior to pad application of KSCN all controls and treated samples were scoured with nonionic surfactant. Thirteen equal dimension fabric samples were treated with KSCN aqueous baths prepared to supply a varied percent by weight of KSCN on weight of fiber up to 2.0%. Two similar dimensioned control fabrics were contacted only with water. All fifteen fabrics were treated in an oven at 120° C. for 60 minutes. Afterwards, all 15 fabric samples were measured individually for yellowness, Y, and their CIE color coordinate b, as in previous examples. The data for yellowness, Y, versus KSCN pad applied percent on weight of fiber is given in FIG. 8 and the CIE b coordinate data presented in FIG. 9.

These two figures show there is a point where there is diminished value in applying more KSCN. In this example, the fabrics treated at KSCN concentrations higher than about 1% experienced an increased objectionable yellow hue, versus untreated. It is believed the initial KSCN exposure up to about 0.1% on weight of fiber protected the amine end groups of the polymer. Once these end groups, in effect a limiting reagent, are fully tied up with thiocyanate there can be no further gain in the reduction of nylon fabric yellowing by heat.

Example 9

A white woven parachute fabric from DuPont Type T335 nylon 66 yarns of 30 denier 10 filaments was aqueously scoured using 1 g/l of soda ash, and 1 g/l anionic surfactant at 180° F. for 20 minutes, rinsed, and then treated with a potassium thiocyanate solution of 5 g/l KSCN in water. The fabric was treated at 210° F. at a pH of 4.5 for 60 minutes. Next, the fabric was rinsed and air-dried. The fabric was then dyed using 1% Rhodamine B dye (Acid Red 52), at pH 4.5, set with monosodium phosphate and acetic acid, for 15 minutes at 210° F., followed by 60 minutes at 160° F. Next the fabric was dried on a tenter frame at 200° F.

The fabric was then tested for tensile strength before and after exposure to ultraviolet light per U.S. Military Specification Test Method Mil C 44378. The UV exposure and tensile strength testing was conducted by TEXTEST LABS (Valley, Ala.). Strength retention for this fabric was excellent at 90% retention in the warp (or loom direction) and 92% in the fill or (cross loom) direction.

Figure 10:
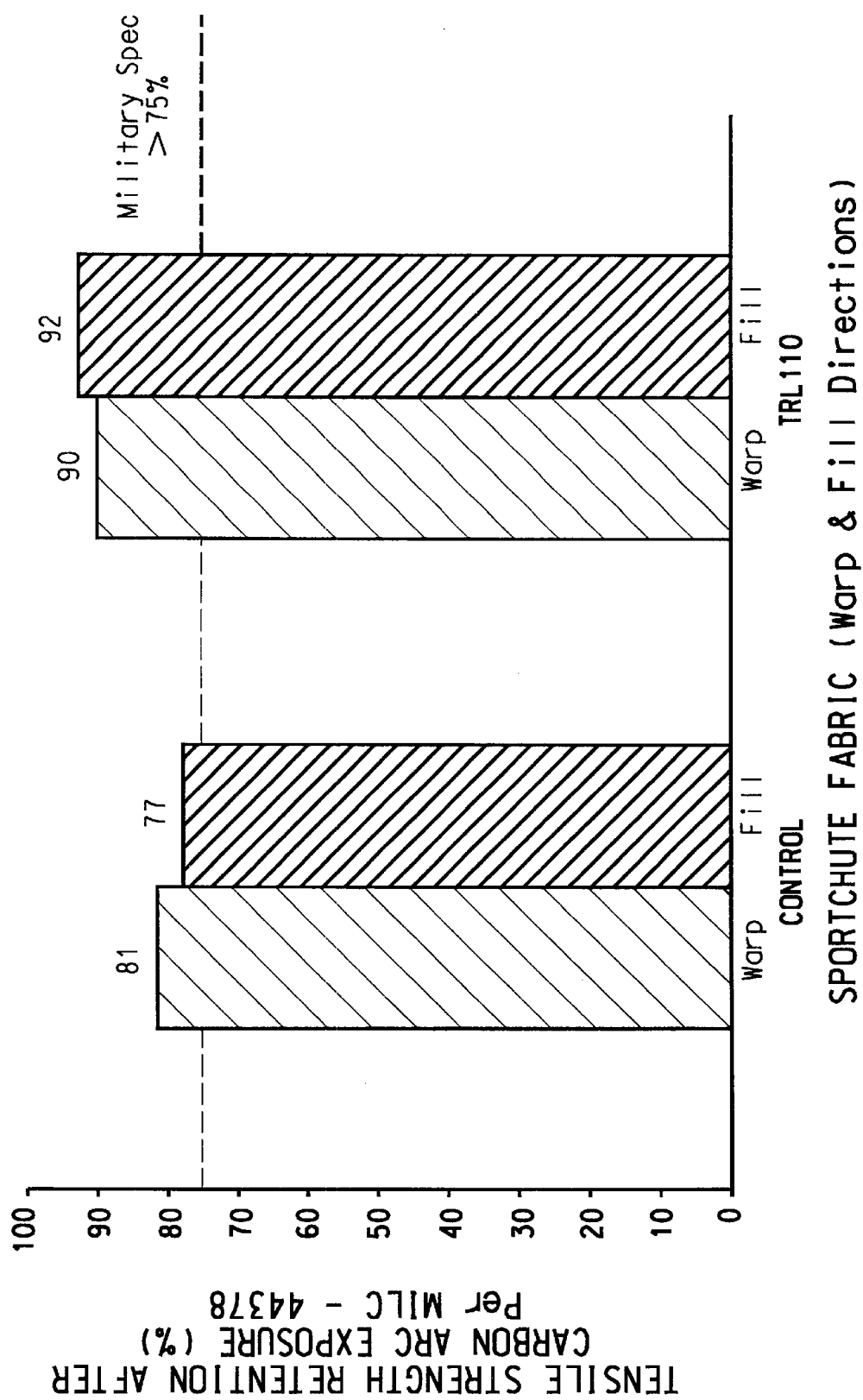
FIG. 10 is a graph showing improved strength retention of dyed nylon fabric treated according to the invention and a control after UV exposure.

FIG. 10 shows the result and compares it with non-treated control fabric. As shown in FIG. 10, the fabric produced according to the present invention retained 9 to 15% more strength than the control fabric and easily exceeded the military specification of at least 75% strength retention.

Comparative Example A

In this comparative example the effect of potassium thiocyanate in the dyeing bath simultaneously with dye is illustrated. The same 200 denier yarn flag fabric of invention Example 2 was dyed with 3 different dyes. The sample fabrics were the same as in Example 2 and measured 929 cm², or about 10 grams weight. The fabrics were dyed in an AHIBA laboratory dyeing apparatus at 99 degrees C for one hour at a 40:1 liquor ratio in each case. First, duplicate fabric samples were dyed with Acid Blue 45 under equilibrium conditions as the control. A second set of fabric samples were dyed using the same dye and with KSCN in the dye bath at a concentration of 5 grams per liter. The results of these dyeings are reported in Table 15.

Next, another duplicate of 200 denier yarn flag fabric samples were dyed with 4% fiber reactive STANALAN Scarlett MFFN dye as the control. A second set of fabric samples were dyed using the same dye and with KSCN in the dye bath at a concentration of 5 grams per liter. The results of these dyeings are reported in Table 15.

Finally, a series of dyeings were performed on the same 200 denier yarn flag fabric but with Acid Blue 122 at 99 degrees C for one hour at a 40:1 liquor ratio in each case. In the control, no KSCN was added to the dye bath. In a separate set of 5 experiments increasing amounts of KSCN was present in the dye bath starting at 2% (equivalent to 0.5 grams per liter in the dye bathE40:1 liquor ratio). The results of the these dyeings are reported in Table 15.

These data in Table 15 show that the presence of KSCN in the dye bath suppresses the dye uptake by the nylon fabric. Compared with the controls in every case the nylon fabric exhibits inferior depth of shade and color strength. The fabrics were only slightly stained by the dyes at concentrations of 5 grams per liter KSCN in the dye bath. As a result, the presence of thiocyanate ion in the dye bath simultaneously with the dye is detrimental to good dyeings on nylon.

TABLE 15

| DYEING | K/S | % CHROMATIC COLOR STRENGTH | % APPARENT COLOR STRENGTH |
| --- | --- | --- | --- |
| Acid Blue 45 CONTROL | 13.86 | 100 | 100 |
| Acid Blue 45 and 5.0 grams/liter KSCN | 1.20 | 8.66 | 10.30 |
| STANALAN Scarlett MFFN CONTROL | 16.85 | 100 | 100 |

TABLE 15-continued

| DYEING | K/S | % CHROMATIC COLOR STRENGTH | % APPARENT COLOR STRENGTH |
| --- | --- | --- | --- |
| STANALAN Scarlett MFFN and 5.0 grams/liter KSCN | 5.9 | 35.41 | 27.17 |
| Acid Blue 122 CONTROL | 8.41 | 100 | 100 |
| Acid Blue 122 and 0.5 grams/liter KSCN | 7.85 | 93.28 | 93.63 |
| Acid Blue 122 and 1.0 grams/liter KSCN | 6.73 | 80.08 | 80.27 |
| Acid Blue 122 and 1.5 grams/liter KSCN | 6.1 | 72.75 | 73.01 |
| Acid Blue 122 and 2.0 grams/liter KSCN | 5.57 | 66.26 | 66.53 |
| Acid Blue 122 and 5.0 grams/liter KSCN | 5.1 | 61.5 | 61.98 |

Although the invention has been described above in detail for the purpose of illustration, it is understood that numerous variations and alterations may be made by the skilled artisan without departing from the spirit and scope of the invention defined by the following claims.

What is claimed is:

1. A process for improving characteristics of a polyamide having X gram equivalents of amine end groups per 1,000 kg of polyamide, comprising contacting the polyamide or a salt useful to form the polyamide, prior to dyeing or other treatment that makes at least a portion of the amine end groups unavailable for subsequent dyeing, with a thiocyanate or reagent that provides thiocyanate, such that the polyamide after contacting or the polyamide formed from the salt contains Y gram equivalents of thiocyanate groups that protect the amine end groups, such that about $0.001 < Y/X <$ about $1.5$.

2. A process as claimed in claim 1, such that $0.001 < Y/X < 1.1$.

3. A process as claimed in claim 1, wherein the contacting comprises contacting a polyamide, wherein the polyamide is in the form of flake, granules, molded articles, film, fiber, staple fiber, continuous filament tow, continuous filament yarn, fabric, garment, carpet or other articles.

4. A process as claimed in claim 1, wherein the polyamide or the salt comprises one or more nylons or nylon salts.

5. A process as claimed in claim 1, wherein the thiocyanate is selected from the group consisting of potassium, sodium, lithium, zinc, copper, and ammonium thiocyanates.

6. A process as claimed in claim 1, further comprising after the contacting, scouring or rinsing the polyamide or the polyamide formed from the salt to remove excess thiocyanate not incorporated into the polyamide or salt.

7. A process as claimed in claim 1, wherein the polyamide or polyamide formed from the salt is stabilized by exposure to heat after the contacting.

8. A process as claimed in claim 1, further comprising after the contacting, dyeing the polyamide or a polyamide formed from the salt.

9. A process as claimed in claim 1, wherein the contacting comprises applying the thiocyanate as a finish to a polyamide, wherein the polyamide is a filament comprising polyamide.

10. A process as claimed in claim 1, wherein the contacting comprises applying the thiocyanate by padding to a polyamide, wherein the polyamide comprises a fabric comprising the polyamide.

11. A process as claimed in claim 1, wherein the polyamide salt is contacted with the thiocyanate.

12. A polyamide produced by the process of claim 1.

13. A polyamide having improved characteristics, wherein the polyamide contains terminal amine dye sites protected by thiocyanate groups.

14. A composition comprising a polyamide salt solution and a thiocyanate.

15. A process for improving characteristics of a polyamide, comprising contacting a polyamide having amine end groups with a thiocyanate, such that the polyamide after contacting contains up to about a stoichiometric amount of thiocyanate group based on the amine groups.

16. A process for improving dyeability characteristics of a polyamide, comprising contacting a polyamide prior to heat-setting or dyeing, with an amount of thiocyanate effective to protect dye-sites of the polyamide.

17. A process for improving characteristics of a polyamide, comprising contacting a polyamide salt with a thiocyanate, and polymerizing the salt to form a polyamide.

18. A process for improving characteristics of a polyamide fiber, yarn, film, tow, fabric, molded article, or garment comprising contacting the fiber, yarn, film, tow, fabric, molded article, carpet, garment or other article prior to any dyeing or other treatment that makes the amine end groups unavailable for subsequent dyeing, with a thiocyanate.

19. A polyamide fiber, yarn, film, tow, fabric, molded article, carpet, garment, or other article produced according to claim 18.

20. A process as claimed in claim 1, wherein the thiocyanate is an organic thiocyanate.

* * * * *